United States Patent
Gedikian

(10) Patent No.: US 9,843,552 B2
(45) Date of Patent: Dec. 12, 2017

(54) CLASSIFICATION AND STATUS OF USERS OF NETWORKING AND SOCIAL ACTIVITY SYSTEMS

(71) Applicant: Apple Inc., Cupertino, CA (US)

(72) Inventor: Steve S. Gedikian, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 654 days.

(21) Appl. No.: 14/079,004

(22) Filed: Nov. 13, 2013

(65) Prior Publication Data

US 2014/0067981 A1    Mar. 6, 2014

Related U.S. Application Data

(62) Division of application No. 13/216,191, filed on Aug. 23, 2011, now abandoned.

(Continued)

(51) Int. Cl.
*G06F 15/16* (2006.01)
*H04L 12/58* (2006.01)
(Continued)

(52) U.S. Cl.
CPC ............ *H04L 51/32* (2013.01); *G06Q 10/10* (2013.01); *G06Q 50/01* (2013.01); *H04L 51/12* (2013.01)

(58) Field of Classification Search
CPC .... G06F 17/30; G06F 17/30867; G06Q 30/02
(Continued)

(56) References Cited

U.S. PATENT DOCUMENTS 7,269,590 B2 *  9/2007  Hull .................. G06Q 10/10
                                                   707/770
7,433,832 B1 * 10/2008  Bezos ................ G06Q 10/10
                                                   705/26.8

(Continued)

FOREIGN PATENT DOCUMENTS

CN    101465823 A    6/2009
JP    2007317177 A   12/2007

(Continued)

OTHER PUBLICATIONS

International Search Report and Written Opinion for International Patent Application No. PCT/US2011/48868, dated Apr. 18, 2012.

(Continued)

*Primary Examiner* — Aftab N. Khan
(74) *Attorney, Agent, or Firm* — Blank Rome LLP

(57) ABSTRACT

Classifications and statuses can be assigned to entities and devices associated with a network (e.g., users of a social activity or networking system) based on media, application, network and/or other information (e.g., purchasable product information). A status or classification can pertain to a subject matter that is, for example, associated with a media and/or applications in a very broad sense or in a specific context (e.g., category, genre, item). As such, a status or a classification can, for example, provide valuable information regarding a user to other users of a social activity system. Among other things, a status or a classification can be used to manage a social activity system, as well as managing information provided by the social activity system.

23 Claims, 16 Drawing Sheets

Related U.S. Application Data

(60) Provisional application No. 61/378,817, filed on Aug. 31, 2010.

(51) Int. Cl.
 *G06Q 10/10* (2012.01)
 *G06Q 50/00* (2012.01)

(58) Field of Classification Search
 USPC ..................................................... 707/6, 776
 See application file for complete search history.

(56) References Cited

U.S. PATENT DOCUMENTS

| | | | |
|---|---|---|---|
| 8,046,410 B1* | 10/2011 | Chen | G06Q 10/103 709/204 |
| 8,135,800 B1* | 3/2012 | Walsh | G06F 17/30702 707/723 |
| 8,272,951 B2 | 9/2012 | Ganz | |
| 8,386,340 B1* | 2/2013 | Feinstein | G06Q 30/02 705/27.1 |
| 9,230,278 B2* | 1/2016 | Cook | G06Q 30/0631 |
| 2001/0014868 A1 | 8/2001 | Herz | |
| 2002/0082901 A1 | 6/2002 | Dunning | |
| 2005/0131897 A1* | 6/2005 | Grasso | G06F 17/30867 |
| 2006/0085259 A1 | 4/2006 | Nicholas | |
| 2006/0143236 A1* | 6/2006 | Wu | G06F 17/30053 |
| 2006/0218153 A1* | 9/2006 | Voon | G06F 17/30873 |
| 2006/0218225 A1* | 9/2006 | Hee Voon | G06Q 30/02 709/201 |
| 2007/0061266 A1 | 3/2007 | Moore | |
| 2007/0220081 A1 | 9/2007 | Hyman | |
| 2007/0239788 A1* | 10/2007 | Cunningham | G06F 3/04817 |
| 2008/0040428 A1* | 2/2008 | Wei | G06Q 50/10 709/204 |
| 2008/0109491 A1* | 5/2008 | Gupta | G06Q 10/10 |
| 2008/0195664 A1 | 8/2008 | Maharajh | |
| 2008/0235189 A1* | 9/2008 | Rayman | G06F 17/30867 |
| 2008/0242221 A1 | 10/2008 | Shapiro | |
| 2008/0242280 A1 | 10/2008 | Shapiro | |
| 2009/0056525 A1* | 3/2009 | Oppenheimber | G06F 17/30743 84/609 |
| 2009/0069911 A1 | 3/2009 | Stefik | |
| 2009/0204478 A1* | 8/2009 | Kaib | G06Q 30/02 705/7.29 |
| 2009/0222551 A1* | 9/2009 | Neely | G06Q 30/02 709/224 |
| 2009/0271289 A1 | 10/2009 | Klinger | |
| 2009/0282144 A1* | 11/2009 | Sherrets | G06Q 30/02 709/224 |
| 2009/0292814 A1 | 11/2009 | Ting | |
| 2010/0030578 A1 | 2/2010 | Siddique | |
| 2010/0115060 A1* | 5/2010 | Julia | G06F 17/30035 709/219 |
| 2010/0121849 A1* | 5/2010 | Goeldi | G06Q 10/00 707/736 |
| 2010/0205663 A1* | 8/2010 | Ward | G06Q 50/01 726/7 |
| 2010/0257183 A1* | 10/2010 | Kim | G06Q 10/10 707/748 |
| 2010/0318571 A1* | 12/2010 | Pearlman | H04L 63/104 707/784 |
| 2010/0325135 A1* | 12/2010 | Chen | G06F 17/30053 707/759 |
| 2011/0125793 A1* | 5/2011 | Erhart | G06Q 30/02 707/776 |
| 2011/0191372 A1* | 8/2011 | Kaushansky | G06Q 30/02 707/776 |
| 2011/0191417 A1* | 8/2011 | Rathod | G06Q 30/02 709/204 |
| 2011/0288962 A1 | 11/2011 | Rankin | |
| 2012/0005203 A1* | 1/2012 | Brzozowski | G06F 17/30867 707/732 |
| 2012/0035976 A1* | 2/2012 | Flinn | G06Q 10/06 705/7.27 |
| 2012/0036446 A1* | 2/2012 | John | G06Q 30/0201 715/739 |
| 2012/0054115 A1 | 3/2012 | Baird-Smith | |
| 2012/0054277 A1 | 3/2012 | Gedikian | |
| 2012/0054666 A1 | 3/2012 | Baird-Smith | |
| 2012/0066614 A1* | 3/2012 | Amidon | G06F 17/30144 715/751 |
| 2012/0311139 A1* | 12/2012 | Brave | G06F 17/30867 709/224 |
| 2015/0379582 A1* | 12/2015 | Jain | G06Q 50/01 705/14.66 |

FOREIGN PATENT DOCUMENTS

| | | |
|---|---|---|
| JP | 2010015565 | 1/2010 |
| JP | 2010500650 | 1/2010 |
| JP | 2010039845 | 2/2010 |
| WO | 2009033182 | 3/2009 |
| WO | 2009137206 A2 | 11/2009 |

OTHER PUBLICATIONS

K. Ogikubo, Twitter X Information Collecting, Mac People, vol. 16, No. 7, May 29, 2010, p. 137-147.

N. Kobayashi, Forefront of Social Commerce, Nikkei marketing, vol. 35, Aug. 25, 2010, p. 42-47.

* cited by examiner

Connection Page — 400

450 Welcome John

Recent Activity ~ 401

- 403 Jane bought an album .. — 402 — 404 15 minutes ago
  - Best of Meatles / Meatles ~ 405
  - (Buy) ~ 406
  - 407 Comment Like Review — 408
- 409 Ed started following — 410 31 minutes ago
  - 411 ~ KC  Peter T.
  - 412 Comment Like — 413
- 414 Betty is going to see .. — 415 1 day ago
  - Earl Rea / Thursday 10/21 / Shoreline – Mountain View, CA ~ 416
  - 417 ~ (Tickets) (I'm Going) — 418
  - 419 Comment Like — 420
- 421 Jimmy, Ray and Agnes comments on Fred's purchase  See details — 422 — 423 2 days ago
  - 424
- 425 Kim liked Fred's purchase  Details — 426 — 427 2 days ago
  - 428
- 429 Fred bought a MacBook Pro .. — 430 2 days ago — 432
  - 431a (See) (Buy) 431b
  - 433 Comment Like Review
- 434 Spence – posted a review — 435 2 days ago
  - Way Good! ***** Best album out there from Jessie Bond
  - Bondie / Jessy Bond ~ 437 — 436
  - (Buy) ~ 438
  - Show album ~ 439
  - 440 Post Like Flag — 441
- 442 Kim's mood is relaxed.. / More — 443 2 days ago
  - 444
- 445 Jane bought a song .. — 446 2 days ago
  - (▶) This one's for you G – by CDT  4:21 — 449b
  - (Buy) ~ 447
  - Show album ~ 448
  - 449a Comment Like (5)

Connections

- Follow Requests (3)
- My Profile ~ 453 — 452
- People ~ 454
- Featured Artists ~ 455
- Featured People ~ 456

CONNECTION CHARTS

457
1. Song A / Artist 1
2. Song B / Artist 2
3. Song C / Artist 3
4. Song D / Artist 4
5. Song E / Artist 5

CONCERTS ~ 458

Near You ~ 459  460
- James Doe / 9/16 - Mountain View, CA
- 2 friends going  (Tickets)
- 461  462

On Tour ~ 463  464
- Genny May / London, Boston
- 2 friends going  (Tickets)
- 465  466

WE RECOMMEND YOU FOLLOW

Artists ~ 468  467
- Orange Day ~ 469
- 101,000 Followers
- 470

People ~ 471
- Kendall Cardwell ~ 472
- 2 friends in common
- 473
- June Lee ~ 474
- 8 friends in common
- 475

FIG. 9

CLASSIFICATION AND STATUS OF USERS OF NETWORKING AND SOCIAL ACTIVITY SYSTEMS

CROSS-REFERENCES

This is a divisional of U.S. patent application Ser. No. 13/216,191, by Steve S. Gedikian, entitled Classification and Status of Users of Networking and Social Activity Systems, filed Aug. 23, 2011, which claims priority to U.S. Provisional Application No. 61/378,817, filed Aug. 31, 2010, both applications of which are incorporated by reference herein in their entirety.

BACKGROUND OF THE INVENTION

Networks and networking systems have been widely used for various applications. In recent times, social networks and social activity systems have become especially popular. Social networking or activity systems allow social interaction online amongst users located in various distant parts of the world. Typically, in a social networking or activity system, users have a user page accessible to other users. Furthermore, in some social activity systems, one user can "follow" another user. In these systems, typically, when one or more users follow another user, "posts" provided by the followed user are presented to all the followers of the followed user. A "post" can, for example, be presented as an update with respect to a location, a mood/feeling, or as recent comments provided by the user being followed. In some systems, location status can be updated automatically.

As social networks become more popular, "following" a significant number of other users can result in a user receiving excessive "posts". This can result in a user missing or ignoring "posts" that are important or of particular interest to the user. In addition, an ever increasing variety of media, applications, and products are becoming widely available to users of online systems. Today, various forms of media, including music and movies are available from various online sources including several online stores. In addition, a wide variety of applications, including games and non-gaming applications (or computer application programs) are available online for download to various devices (e.g., Smartphones, computers).

Thus, there is a need for improved management of networks, especially social activity networks supporting a relatively large number of users interested in various forms of media, applications, as well as other products.

SUMMARY

Embodiments of the invention disclosed herein relate to enhanced networks and social activity or networking systems. According to one aspect, methods and systems being described can assign classifications and statuses to various entities and devices associated with a network (e.g., users of a social activity or networking system) based on media, application, network and/or other information (e.g., purchasable product information). A status or classification can pertain to a subject matter that is, for example, associated with a media and/or applications in a very broad sense or in a specific context (e.g., category, genre, item). As such, a status or a classification can, for example, provide valuable information regarding a user to other users of a social activity system. By way of example, a user can be classified as a music expert, as a high volume application user, as an expert in a particular genre of music or movies, or as a novice with respect to a specific media asset, item, or event (e.g., a particular song, a movie, concert, gaming application, product). Among other things, a status or a classification can be used to manage a social activity system, as well as managing information provided by the social activity system.

The invention can be implemented in numerous ways, including as a method, system, device, apparatus (including computer readable medium and graphical user interface). Several embodiments of the invention are discussed below.

As a method for assigning a status to a user of a social activity system, one embodiment of the method can, for example, include at least the operations of: monitoring user attribute information for a plurality of users of the social activity system; and evaluating the user attribute information to assign a user status to one or more of the users. The method can further include the act of arranging information provided by the social activity system in accordance with the user status of the one or more users.

As a method of assigning a classification to an entity that can be connected to a network for communication with one or more other entities, one embodiment of the method can, for example, include at least the operations of: obtaining at least one of: (i) first media information associated with at least a first entity that can be connected to the network, and (ii) first network information associated with at least the first entity; and assigning one or more classifications to at least the first entity at least partially based on at least one of: the first media information (i) and the first network information (ii), wherein the one or more classifications are at least reflective of a media classification of the first entity.

As computing system (e.g. a server, an online activity monitoring and distribution system), one embodiment of the system can, for example, include one or more processors or processing cores configured to at least perform the following: monitor user attribute information for a plurality of users of a social networking system, evaluate the user attribute information, and assign a user status to one or more of the users at least partly based on the evaluating.

As a computer readable medium including at least computer program code tangibly stored thereon for assigning a status to a user of a social networking system, the computer readable medium can include at least: computer program code for monitoring user attribute information for a plurality of users of a social networking, computer program code for evaluating the user attribute information, and computer program code for assigning a user status to one or more of the users at least partly based on the evaluating.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 9 is a connection page according to one embodiment.

DETAILED DESCRIPTION OF EMBODIMENTS OF THE INVENTION

Embodiments of the invention disclosed herein relate to enhanced networks and social activity or networking systems. According to one aspect, methods and systems being described can assign classifications and statuses to various entities and devices associated with a network (e.g., users of a social activity or networking system) based on media, application, network and/or other information (e.g., purchasable product information). A status or classification can pertain to a subject matter that is, for example, associated with a media and/or applications in a very broad sense or in a specific context (e.g., category, genre, item). As such, a status or a classification can, for example, provide valuable information regarding a user to other users of a social activity system. By way of example, a user can be classified as a music expert, as a high volume application user, as an expert in a particular genre of music or movies, or as a novice with respect to a specific media asset, item, or event (e.g., a particular song, a movie, concert, gaming application, product). Among other things, a status or a classification can be used to manage a social activity system, as well as managing information provided by the social activity system.

Several embodiments of the invention are discussed below with reference to FIGS. 1-13. However, those skilled in the art will readily appreciate that the detailed description given herein with respect to these figures is for explanatory purposes as the invention can extend beyond these limited embodiments.

Figure 1:
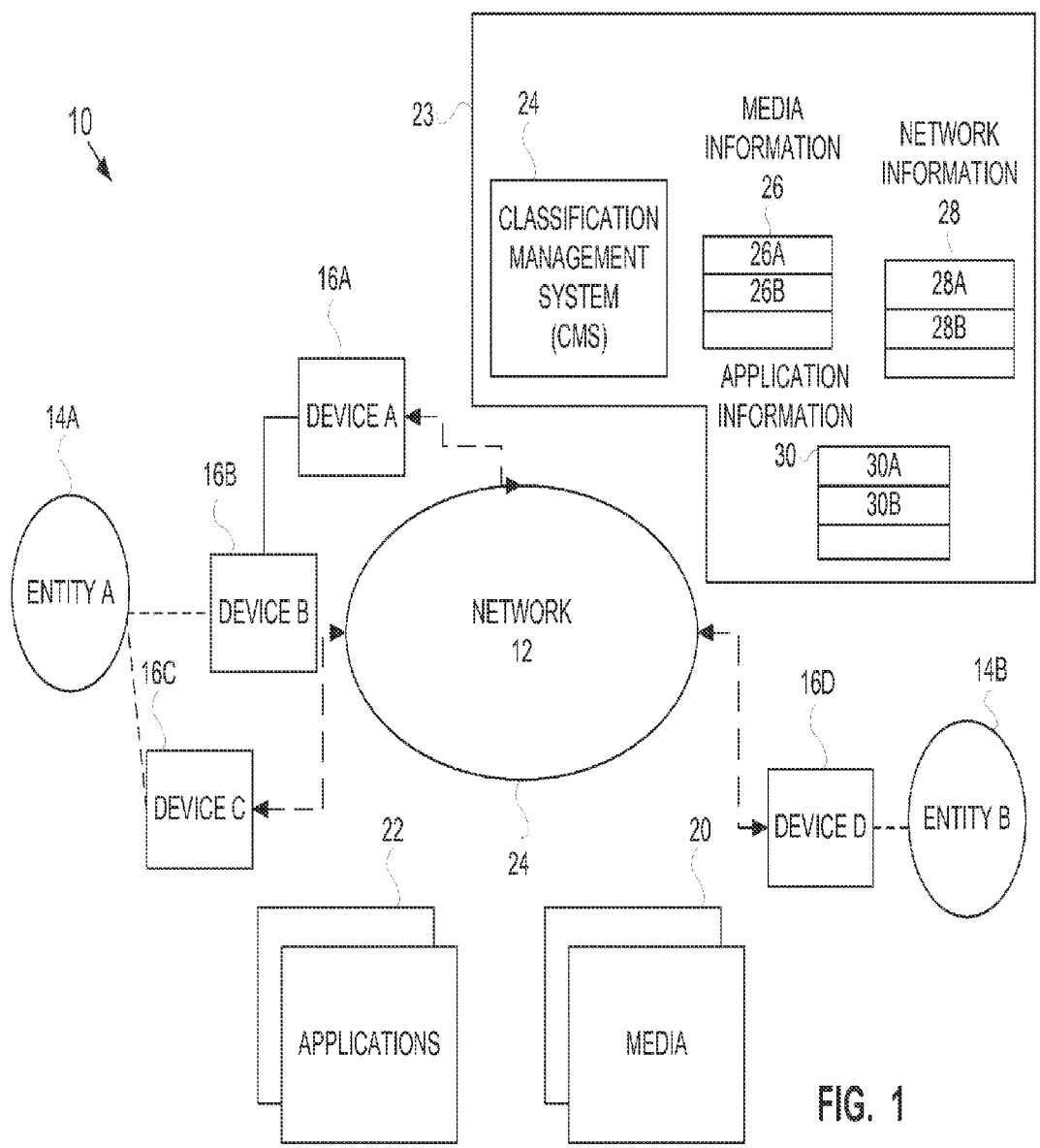
FIG. 1 is a block diagram of a communication or networking environment in accordance with one embodiment.

FIG. 1 depicts a communication or networking environment 10 in accordance with one embodiment. Referring to FIG. 1, a network 12 can facilitate communication between entities 14. In other words, entities 14 can effectively communicate via a network 12 (e.g., a public network, a private network, a Local Area Network (LAN), a Wide Area Network (WAN), the Internet). An Entity 14 can, for example, be representative of one or more persons or individuals, a group, company, an organization, and so on. To communicate via network 12, an entity 14 can use one or more devices 16 (e.g., a computing device, a communication device, a Personal Computer (PC), a laptop, a pad, a Smartphone, a communication device with media playback capabilities, a media player that can effectively connect to network 12 via another device). An entity 14 may also be associated with the same device or devices 16 used to connect to and/or communicate via the network 12. By way of example, a person may own a number of devices 16 registered and/or identifiable in the network 12. In addition to communication capabilities, a device 16, such as, for example, a PC or a Smartphone may have media playback capabilities and/or capable of executing or running one or more applications including games, and so on. It should be noted that a media playback device 16 (e.g., a media player) may be operable to be connected to the network 12 via another device (e.g., a PC) to facilitate exchange of media and information via the network 12. Generally, media 20 and applications 22 can be distributed in the network 12, available from one or more libraries or online stores (not shown), can be stored on various devices (not shown) operable to connect to the network 12 directly or indirectly. As such, a number of entities 14 can use various devices 16 to connect to network, and access or playback media 20 and/or execute or run one or more applications 22.

Moreover, a Classification Management System (CMS) 24 can effectively assign classification (or statuses) to entities 14 and/or devices 16 in the communication or networking environment 10 depicted in FIG. 1. Those skilled in the art will readily know that the CMS 24 can, for example, be provided as computing system (e.g., a server) that includes one or more processors or processing cores operable to execute computer program code stored in a computer readable medium (e.g., memory). Generally, a classification assigned by the CMS 24 can correspond to a classification (or status) of an entity 14 with respect to media 20 and/or one or more applications 22. It will be appreciated that a classification can, for example, be reflective of ranking, position, or placement of a person with respect to media 20 and applications 22, in a general sense or in a specific category (e.g., music, movies, games), a genre or a specific category of media 10 or applications 22 (e.g., jazz, comedy, first person shooter games), specific to a single or narrow topic, asset, item, collection, artist, band, director, game (e.g., "Pink Floyd" music, "God Father" movies, "Rod Stewart's best live concerts," "Billy Joel's rock videos," "Company of Heroes games"). By way of example, a classification assigned to an entity 14A can be reflective of knowledge, level of expertise, or interest of the entity 14A in music, a particular band or artist, a particular album, or a single song.

It will also be appreciated that CMS 24 can assign one or more classifications to an entity 14 and/or a device 16 based on media information 26 and/or network information 28. In other words, CMS 24 can effectively use media information 26A and/or network information 28B that may, for example, be associated with or pertain to a specific entity 14A to assign one or more classifications to the entity 14A. Similarly, a CMS 24 can effectively use media information 26 and/or network information 28 pertaining to a specific device (not shown) to assign one or more classifications to the device. It should be noted that information 26A can, for example, include media collection information pertaining to media content associated with the entity 14A and/or media usage information associated with use of media by the entity 14A. Generally, network information 28A pertains to information available, known, or in the network 12 regarding the entity 14A. Typically, a classification assigned by the CMS 24 is at least reflective of media (e.g., media knowledge, media usage) As such, a classification assigned by the CMS 24 to an individual can, for example, be based on media played and/or purchased by a person, as well as other information known regarding the person (e.g., location, number of friends in the network, active participation is media related activities, such as, posting reviews). It should be noted that CMS 24 can additionally or alternatively use aggregate media information 26 and aggregate network information 28 pertaining to multiple entities 14. By way of example, aggregate media and network information (26 and 28) can be used to comparatively rank entities 14 with respect to their media collection, media knowledge, media use, and/or active participation.

Generally, a classification or statues assigned to an entity 14 can be made known to the entity and possibly other entities in the communication or networking environment 10 by various mechanisms (e.g., displaying a status on a page, informing a user by email or postal mail). Making a user classification or status known in context of social activity can be generally desirable and useful.

It will be appreciated that the communication or networking environment 10 can, for example be, a social networking system (e.g., a social activity system, or a social activity following system) where assigning classifications or statuses to users and can be especially useful.

Referring to FIG. 1, as a social networking system, the networking environment 10 can connect a number of users (represented as entities) 14 for social networking or social activity. In this social networking or activity system, CMS 24 can obtain media information from pertaining at least in part to media associated with a user (e.g., a user 14A). The media information can be used by the CMS 24 to determine and assign one or more classifications to the user. The classification can, for example, effectively rank or place the user with respect to his or her media collection, media knowledge and/or media use from other users of the social networking system (10) so that a user may, for example, be distinguished as an expert from other users who may be classified as novice. Such classifications are especially useful in large or public social networking systems supporting many users where additional objective knowledge about users may be useful. Generally, classification of user at least with respect to their association with media in a general sense or with respect to a specific context (e.g., a particular form of media) is especially useful in social networking system where, among other things, classifications can be used to affect communication or social activity in a social setting.

Still further, in a social networking system (10) the CMS 24 can be operable to assign contextual classifications pertinent to a specific context or subject area (e.g., category, type, genre, item, etc.) Such classifications are especially useful today when a wide variety of media and applications are available and are widely used. By way of example, the CMS 24 can assign a classification that effectively identifies a user as an expert in applications and assign another classification to another user identifying the user as an expert in media. As another example, classifications can pertain to a specific category or type of media or applications (e.g., music, games, videos, word processing applications). Still, classifications assigned by the CMS 24 can classify a user in the context of a specific genre, topic, or even an item of media or a particular application that may be input as a search phrase (e.g., music of Beatles, the "dark side of the moon" album, a song named "songs to the siren," by "This Mortal Coil," the "Mafia Wars" games, good Christian rock music, Visio drawing application). Referring to FIG. 1, the CMS 24 can obtain data from the media information 26, network information 28 and/or application information 30 associated with one or more users 14 of the social networking or activity system 10. The CMS 24 can then assign one or more classifications to one or more users based on the information obtained. It should be noted that the one or more classifications can effectively rank or position the user in the social network at least with respect to a specific subject area (e.g., media, music, applications, classical music, games, music of Pink Floyd, a particular song album, song, gaming or non-gaming application). In any case, an assigned user classification or status can be effectively communicated to entities 14 via devices 16. By way of example, CMS 24 can cause a user status assigned to an entity 14A to be displayed on a display associated with a device 16A used by the entity 14A. The CMS may also cause the user status assigned to the entity 14A to be displayed on a display associated with another device 16D used by an another entity 14B.

Figure 2:
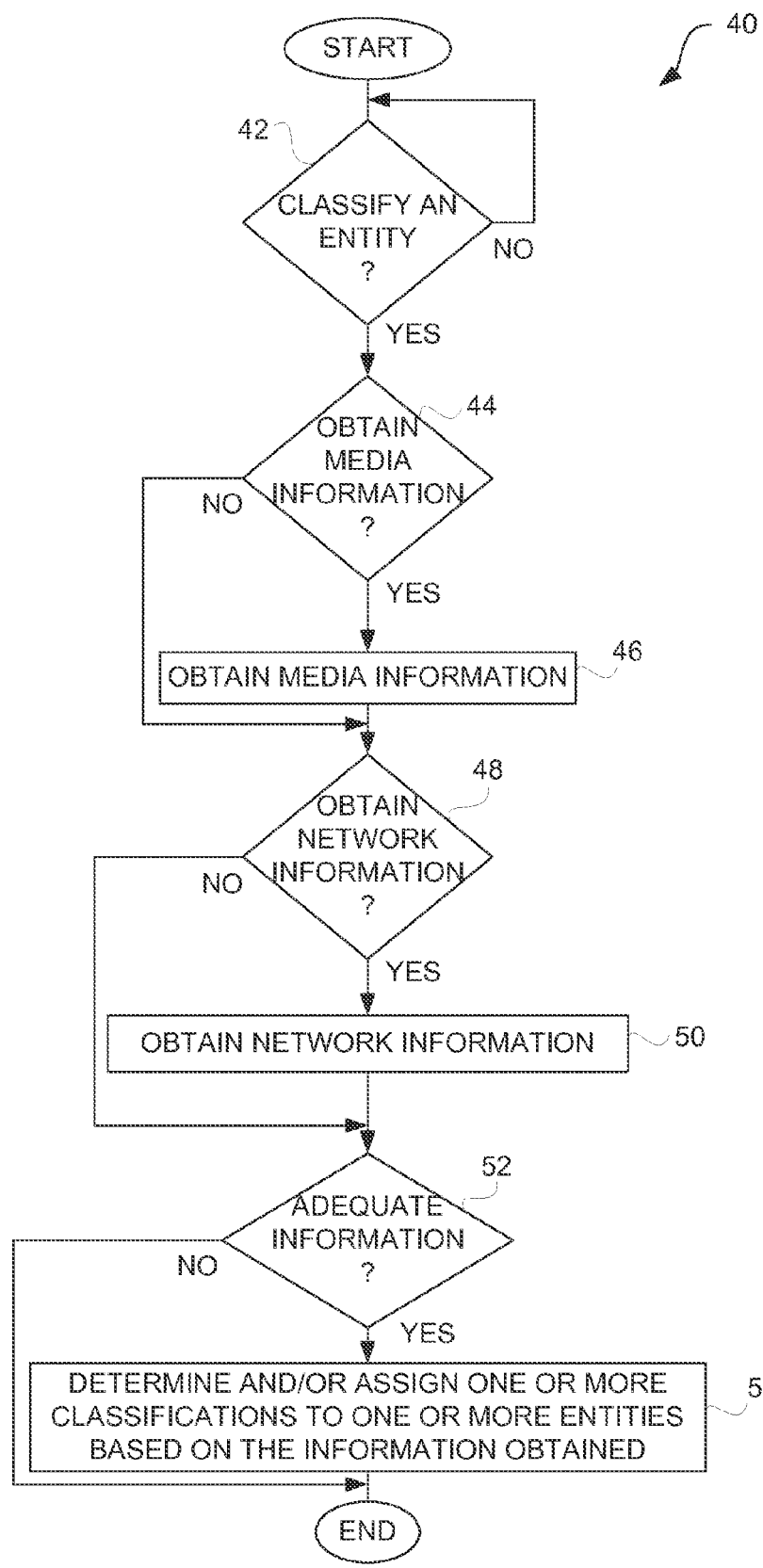
FIG. 2 depicts an exemplary method for assigning a classification (or status) to an entity in a network in accordance with one embodiment.

FIG. 2 depicts an exemplary method 40 for assigning a classification (or status) to an entity in a network in accordance with one embodiment. Method 40 can, for example, be used by the CMS 24 depicted in FIG. 1. Referring to FIG. 2, initially, it is determined 42 whether to classify an entity in the network. By way of example, it can be determined 42 in a social networking system whether to classify a user. This determination 42 can, for example, be made based on occurrence of an event, request made by the user, and purchase of a media or application at an online store. In effect, method 40 can wait for a determination 42 to classify an entity. When it is determined 42 to classify an entity, it is determined 44 whether to obtain media information. Media information can, for example, pertain to media associated, owned, purchased and/or used by a person who uses the social networking or activity system. Consequently, media information can be obtained 46. Next, it is determined 48 whether to obtain network information. It should be noted that if it is determined 44 not to obtain media information, the method 40 can proceed directly to determine 48 whether to obtain network information. Those skilled in the art will readily appreciate that the determinations (44 and 48) of whether to obtain media and network information can, for example, each represent a design or programming choice, or can be made statically or dynamically based on various criteria, including system or user settings and/or preferences. In any case, if it is determined 48 to obtain network information, network information can be obtained 50. Network information can, for example, include information regarding the reviews or conversations that a user has had regarding media or a particular form of media in a social networking system. As another example, network information can include the number of users that are following a user or have read the reviews of the user, and/or reflect expressed opinions regarding the user's level of knowledge and usefulness of his or her recommendations about media, applications, or a specific subject area relating to media and/or applications.

In effect, media and/or network information can be obtained before a classification is determined. In addition, it can optionally be determined 52 whether adequate information has been obtained to determine and assign a classification. Although not shown in FIG. 2, it should be noted that in the absence of adequate information, for example, a default classification can be determined for assignment. Also, it is possible to make a classification simply based on any information available. However, referring back to the exemplary method 40 depicted in FIG. 2, if it is determined 52 that adequate information has not been obtained, the method 40 ends. On the other hand, if it is determined 52 that adequate information has been obtained, one or more classifications are determined and/or assigned 54 to an entity at least partially based on media information and/or network information that has been obtained. Method 40 ends following the determination and/or assignment 54 of one or more classifications to an entity.

Figure 3:
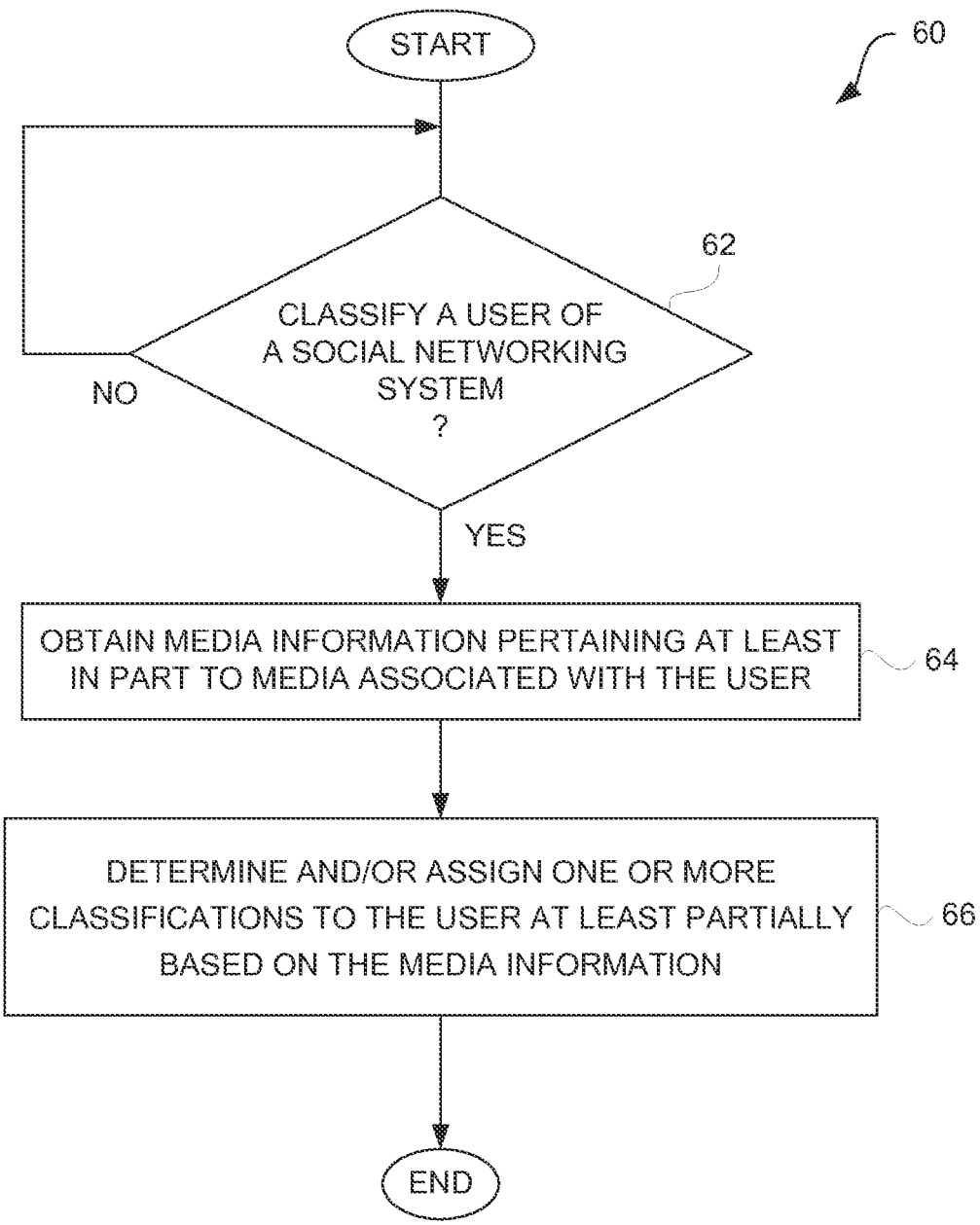
FIG. 3 depicts an exemplary method for assigning a classification (or status) to a user of a social networking system in accordance with one embodiment.

FIG. 3 depicts an exemplary method 60 for assigning a classification (or status) to a user of a social networking system in accordance with one embodiment. Method 60 can, for example, be used by the CMS 24 depicted in FIG. 1. Referring to FIG. 3, initially, it is determined 62 whether to classify or assign a status to a user of the social networking system. This determination 62 can, for example, be made based on occurrence of an event, request made by the user, and purchase of a media or application at an online store. In effect, method 60 can wait 62 for a determination to classify or assign a status to a user of the social networking system. If it is determined 62 to classify or assign a status to a user of the social networking system, media information is obtained 64. The media information can at least in part pertain to media associated with the user of the social networking system. As such, media information can include other information. For example, the media information can also include media information associated with media not associated with the user and/or media associated with other users of the social networking system. Subsequently, one or more classifications or statuses are determined and/or assigned 66 to the users based at least partly based on the media information. Method 60 ends following the determination and/or assignment 66 of the one or more classifications or statuses. Although not shown in FIG. 3, it should be noted that additional information including network and application information can be obtained and used to classify or assign a status to a user in a social networking system and setting.

Figure 4:
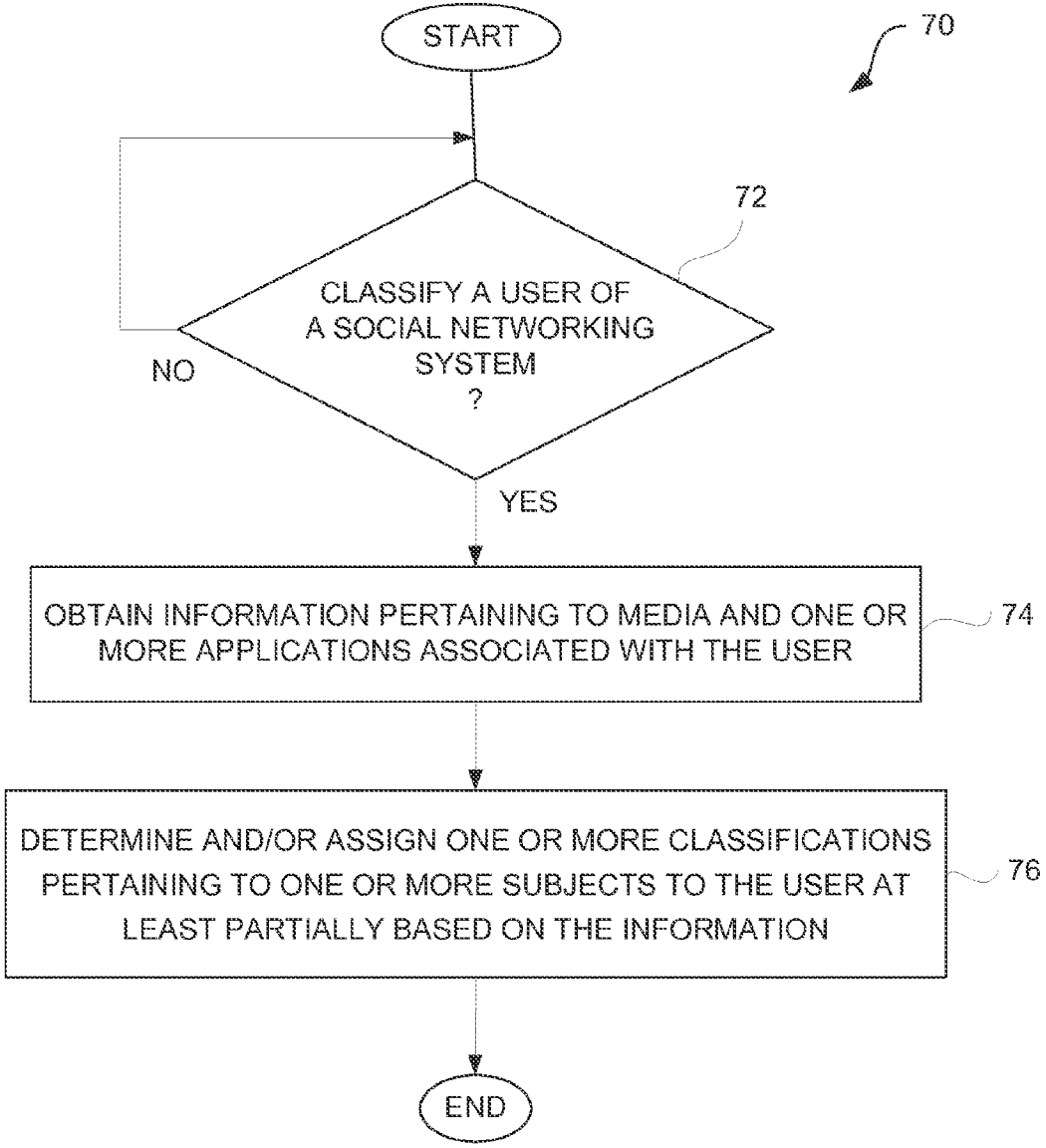
FIG. 4 depicts another exemplary method for assigning a classification or status to a user of a social networking system in accordance with another embodiment.

To further elaborate, FIG. 4 depicts another exemplary method 70 for assigning a classification or status to a user of a social networking system in accordance with another embodiment. Method 70 can, for example, be used by the CMS 24 depicted in FIG. 1. Referring to FIG. 4, initially, it is determined 70 whether to classify or assign a status to a user of the social networking system. In effect, method 70 can wait 72 for a determination to classify or assign a status to a user of the social networking system. If it is determined 72 to classify or assign a status to a user of the social networking system, information pertaining to media and one or more applications associated with the user of the social networking system is obtained 74. Subsequently, one or more classifications or statuses pertaining to a subject area (or subject matter) associated with media and/or application(s) are determined and/or assigned 76 at least partly based on the information obtained. A classification or status can effectively rank or comparatively place a user relative to other users of the social networking system with respect to a subject area. The subject matter may merely make a distinction between applications and media (e.g., a media expert versus an application expert). The subject matter may also pertain to a broad category (e.g., application knowledge, music use), or may be directed to a narrower subject matter (e.g., word processing reviews, Rod Stewart expert), and so on. The method 70 ends following the determination and/or assignment 76 of the classification(s) or statuses to a user. Although not shown in FIG. 4, it should be noted that additional information including network information can be obtained and used to classify or assign a status to a user in a social networking system and setting.

Typically, it is more desirable and/or useful to assign a classification to a person, or at least an entity, rather than a device. As such, assignments of classifications to entities, especially users of the devices and the system (e.g., persons, and individuals) are described in greater detail below. Furthermore, given the prevalence of social networking, classifications assigned to persons in or in the context or a social network or social activity network (e.g., a social activity following system) are described in greater detail below.

Figure 5:
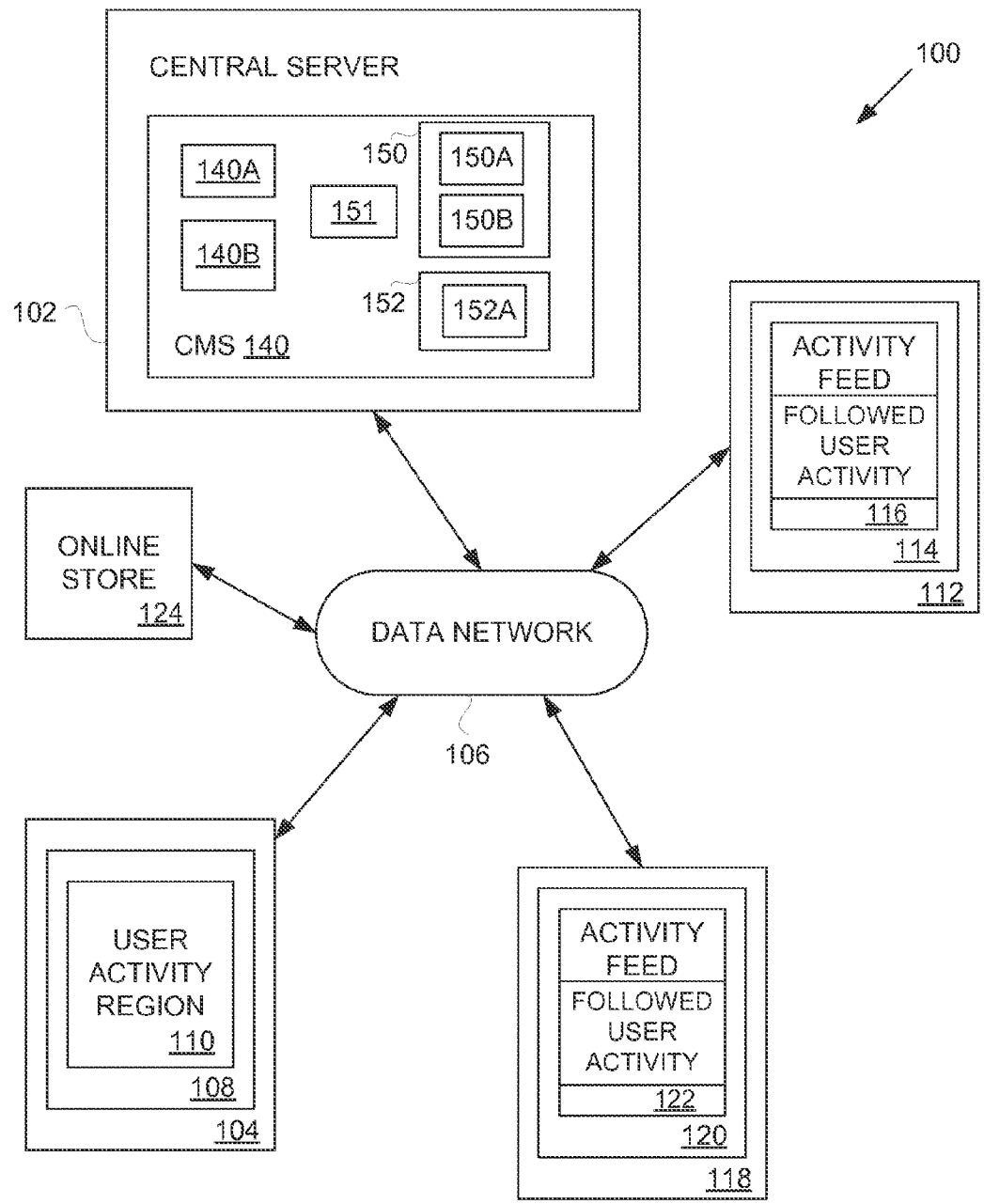
FIG. 5 depicts a block diagram of a social activity system according to one embodiment.

To further elaborate, FIG. 5 depicts a block diagram of a social activity (or social networking) system 100 according to one embodiment. Referring to FIG. 5, the social activity system 100 includes a central server 102. Those skilled in the art will readily know that the central server 102 can, for example, include one or more central processors, or processing cores (not shown). As such, the central server 102 can be operable to execute code stored in a computer readable storage medium (e.g., memory, storage device) (not shown). The central server 102 can also store media information and/or network information, as well as profiles and other information pertaining to a plurality of users of the social activity system 100.

The social activity system 100 can, for example, be a social activity following system allowing its users to access their profiles, as well as profiles of other users. Additionally, users of the social activity following system can allow users to follow other users. The central server 102 can be operable to facilitate social activities or social following activities. Still further, as a component of the social activity following system, the central server 102 may be operable to provide recommendations of other users that one might be interested in following.

Generally, the social activity system 100 can support a plurality of user computers associated with the users of the social activity system 100. This support can be at least provided or facilitated by the central server 102. In particular, the social activity system 100 illustrates a user computer 104 that can couple to a data network 106. The central server 102 is also coupled to the data network 106. The user computer 104, though interaction with the central server 102 can, for example, be capable of presenting a user page 108. For example, the user computer 104 can include a display that is capable of presenting a user page 108 with a user activity region 110. The user activity region 110 can, for example, present an activity feed within the user activity region 110.

Referring to FIG. 5, for simplicity, the central server 102 is depicted to include a CMS 140 operable to assign classifications to users of the social activity system 100. However, it should be noted that CMS 140 can be separated from the central server 102 and/or can be effectively distributed between a number of devices, including or not including the central server 102. In addition to assigning classifications to users, the CMS 140 and/or the central server 102 can also be operable to effectively make use of the classifications, for example, to affect social communication between the users in the social activity system 100.

Conceptually, the CMS 140 can at least include a classifier component 140A and optionally include an effectuating component 140B. The classifier component 140A can determine and assign a classification or status to a user of the social activity system 100. The determination of a classification or status can at least in part be made based on media information 150, application information 151 and/or network information 152. Generally, this information used to determine a classification or user status can at least in part be stored by the central server 102. As shown in FIG. 5, the media information 150 can include media collection information 150A and media usage information 150B. Media collection information 150A can, for example, include media content and metadata. Media content typically represent a portion of media that can be played back (e.g., musical content). In contrast, media metadata may include information or data about the media content. Media content can, for example include one or more of the following forms: an audio file, a video file, an audio visual file, a song, an album, a movie, a book, a playlist, and a media library. Metadata can, for example, include one or more of the following: information about the media content, album art, title, textual data, rating, purchase, time of purchase, and place of purchase. In contrast, media usage information 150B can generally provide information regarding the use of media by one or more users. As such, the media usage information 150B can, for example, include one or more of the following: time, place, manner and/or number of times media has been used, and duration of usage.

The classifier component 140A can obtain the media collection information 150A and/or media usage information 150B. Moreover, the classifier component 140A can determine a classification or a user status based on the media collection information 150A and/or media usage information 150B. This information can pertain to a particular user and/or pertain to data collected for multiple users of the social activity system 100. By way of example, the classifier component 140A can obtain media collection information 150A indicative of a user having purchased or owning a complete collection of a particular artist (e.g., complete collection of music by Rod Stewart). Based on this information, the classifier component 140A can determine and assign a user status to the user, such as, for example, "a music fan," "crazy about Rod Stewart," "80's Rock fan." As another example, the classifier component 140A can also obtain the media usage information 150B pertaining to use of his or her collection, and determine that the user has recently (e.g., in the last 6 months) played a relatively large portion (e.g., at least 90 percent) of this collection. As such, the classifier component 140A can assign one or more user statuses, such as, for example, "active music fan," "still crazy about Rod Stewart," and so on.

It will also be appreciated that network information 152, especially, social network information 152A can additionally or alternatively be used by the classifier component 140A to determine a classification for a user of the social activity system 100. Generally, social network information 152A can provide personal or social information pertaining to one or more users, user interactions, and/or social activity or participation in the social activity system 100. As such, referring to the example noted above, the social network information 152A can, for example, indicate that the same user who has been actively playing a complete collection of works by an artist, has also written a number of reviews regarding the work of this artist and has also received a number of positive feedbacks on his reviews. The social network information 152A may also include a user profile which can, for example, be indicative of an observed level of knowledge of the user regarding a particular form of media of specific genre of media (e.g., Rod Stewart's music). The social network information 152A may also, for example, indicate that the user has several friends or followers who have expressed positive feedbacks regarding the recommendations made by this user regarding media item pertaining to an artist, and so on. As a result, this user may, for example, be classified or assign one or more users statuses, such as, for example, "knowledgeable music fan," "expert in Rod Stewart's music," and so on.

It should be noted that the CMS 140 can also use application information 151 in a similar manner as noted above with respect to media information. Although not illustrated in FIG. 5, the application information can include application collection information and application usage information. The application collection information can include data regarding application content (e.g., applications purchased or downloaded) and the application usage information can include data pertaining to usage of applications (e.g., time and duration of use) by users of the social activity system 100. The network information 152 can also provide additional information associated with users pertaining to applications similar to that noted above with respect to media.

As noted above, the CMS 140 can optionally include an effectuating component 140B operable to effectively use a classification assigned to a user in the social activity system 100. The effectuating component 140B can, for example, use one or more user statuses assigned to one or more users to effect communications associated with the same or other users of the social activity system 100. By way of example, communications of feeds of a user regarding a specific media item can be optionally filtered or blocked with respect to other users if the user providing the communication or feed is not classified as an expert in a specific genre pertaining to the specific media item. As a result, the effectuating component 140B can, for example, effectively block or filter reviews submitted by non-expert users regarding a media asset (e.g., an album, a song, a movie) for other users who wish to see only reviews by "expert" users in a subject matter pertaining to the media asset.

The effectuating component 140B may also be operable to determine one or more events based on the one or more statuses assigned to one or more users. For example, the effectuating component 140B can determine that a user classified as an "expert" in Rod Stewart's music has just purchased music by the same or another similar artist. This would constitute an event (or a synthetic event) that may cause an action, such as, for example, notifying other users with similar interests and/or other users that are explicitly following the user of the purchase in case other users would also be interested in making the same purchase. In addition, various other actions can be taken or caused to be taken by the effectuating component 140B. For example, a form of a reward, gift, and/or complementary value can be assigned to one or more users by the effectuating component 140B at least partly based on one or more status determined and assigned by the classifier component 140A. A reward can, for example, be an unreleased song, limited edition media items with release numbers, and allowing a user to host their own page. Other examples include: (i) storing one or more classifications for one or more users, (ii) sending one or more users a communication, a notice, or an offer; (iii) displaying one or more classifications assigned to a user to one or more other users; (iv) and identifying or recommending to users a particular user as a one to be followed or not to be followed, possibly with respect to a particular media categories, genres, or items.

Generally, in the social activity system 100, the CMS 140 can also be operable to monitor user attribute information for and/or pertaining to multiple users of the social activity system (e.g., media information 150, network information 152, application information 151). As such, the user attribute information can, for example, include media information, application information, and network information. The CMS 140 can evaluate the user attribute information to assign one or more user statuses to one or more of the users. In addition, the CMS 140 can arrange information provided by the social networking system in accordance with the one or more user statuses of the one or more users. It will be appreciated that the user status can be associated with a subject area including subject areas associated with media and applications. In addition, the CMS 140 can evaluate and assign a plurality of user statuses to a user, such that each of the user status being associated with a different subject area. It should be noted that a subject area can, for example, be a genre of digital media assets and/or pertain to an artist or author of digital media assets.

Generally, a user classification or user status can be assigned to a user of a social activity system. Furthermore, a classification or status can be made known to the user and possibly other users of the social activity system. By way of example, a user status can be displayed on a user page 108 such that other users of the social activity system 100 may also be able to view the status assigned to the user. A user status is especially useful in the context of a social activity following system where activities of a user may be followed by others. As such, displaying a user status is further described in the context of a social activity following system.

As noted above, the social activity system 100 can, for example, be a social activity following system. In a social activity following system, a user computer 104 can, for example, include a display that is capable of presenting the user page 108. The user page 108 can include a user activity region 110. The user activity region 110 can present an activity feed within the user activity region 110. Generally, a classification or user status can be displayed As a social activity following system, the system 100 can also support a plurality of follower computers that can be associated with users that follow other users. In the example illustrated in FIG. 5, there are two followers of the user associated with the user computer 104. Specifically, as a social activity following system, the system 100 can support a follower computer 112 having a display capable of presenting a follower page 114. The follower page 114 can include an activity feed 116. The activity feed 116 can, among other things, include followed user activity. As an example, the followed user activity being presented in the activity feed 116 can pertain to the user activity associated with at least the user of the user computer 104. However, typically, the followed user activity being presented in the activity feed 116 can pertain to the user activity associated with the user of the user computer 104 as well as user activity associated with various other users also being followed. Additionally, as a social activity following system, the system 100 can support a follower computer 118 having a display capable of presenting a follower page 120. The follower page 120 can include an activity feed 122. The activity feed 122 can, among other things, include followed user activity. As an example, the followed user activity being presented in the activity feed 122 can pertain to at least the user activity associated with the user of the user computer 104. In another example, the followed user activity being presented in the activity feed 122 can pertain to the user activity associated with the user of the user computer 118 as well as user activity associated with various other users also being followed.

More generally, the user page 108 as well as the follower pages 114, 120 can be electronic pages. As such, a user computer 104 can receive the electronic page for the user page 108 from the central server 102, and then present the electronic page on the display of the user computer 104. Similarly, the follower computers 112, 118 respectively receive electronic pages for the follower pages 114, 120, and then respectively present the electronic pages on the displays of the follower computers 112, 118.

It will be appreciated that central server 102, among other things, can also manage the activity feeds for the various users, including followers. That is, when the user activity feed within user activity region 110 is updated (e.g., by including a new activity posting), the updated user activity can also propagate to the followers of the user. In such case, the corresponding follower pages 114, 120 can be updated to include followed user activity corresponding to the updated user activity within the activity feeds 112, 122. However, it should be noted that a follower typically follows a plurality of different users. As such, the activity feeds presented on a follower page typically integrate activity from a plurality of different users as well as activity associated with the corresponding follower (user).

The social activity following system 100 can also support an online store 124. The user can interact with the online store 124 to engage in e-commerce transactions to purchase products or services. In one embodiment, the online store 124 can facilitate purchase of electronic products (or digital assets), such as digital media or software programs. As one example, the online store 124 can pertain to an online media store from which users can purchase numerous media. As another example, the online store 124 can pertain to an online application store from which users can purchase numerous application programs. It should be noted that if a purchase occurs from the online store 124 by the user, an activity event can be produced. The activity event can be inserted into the user activity region 110 of the user page 108. The central server 102 can also propagate or provide the activity event of the user to those of the followers of the user. Consequently, the follower pages 114, 120 of the follower pages 112, 118 can receive the activity event associated with the user and cause an activity post to be presented in the activity feed associated with the follower pages 114, 120.

Figure 6:
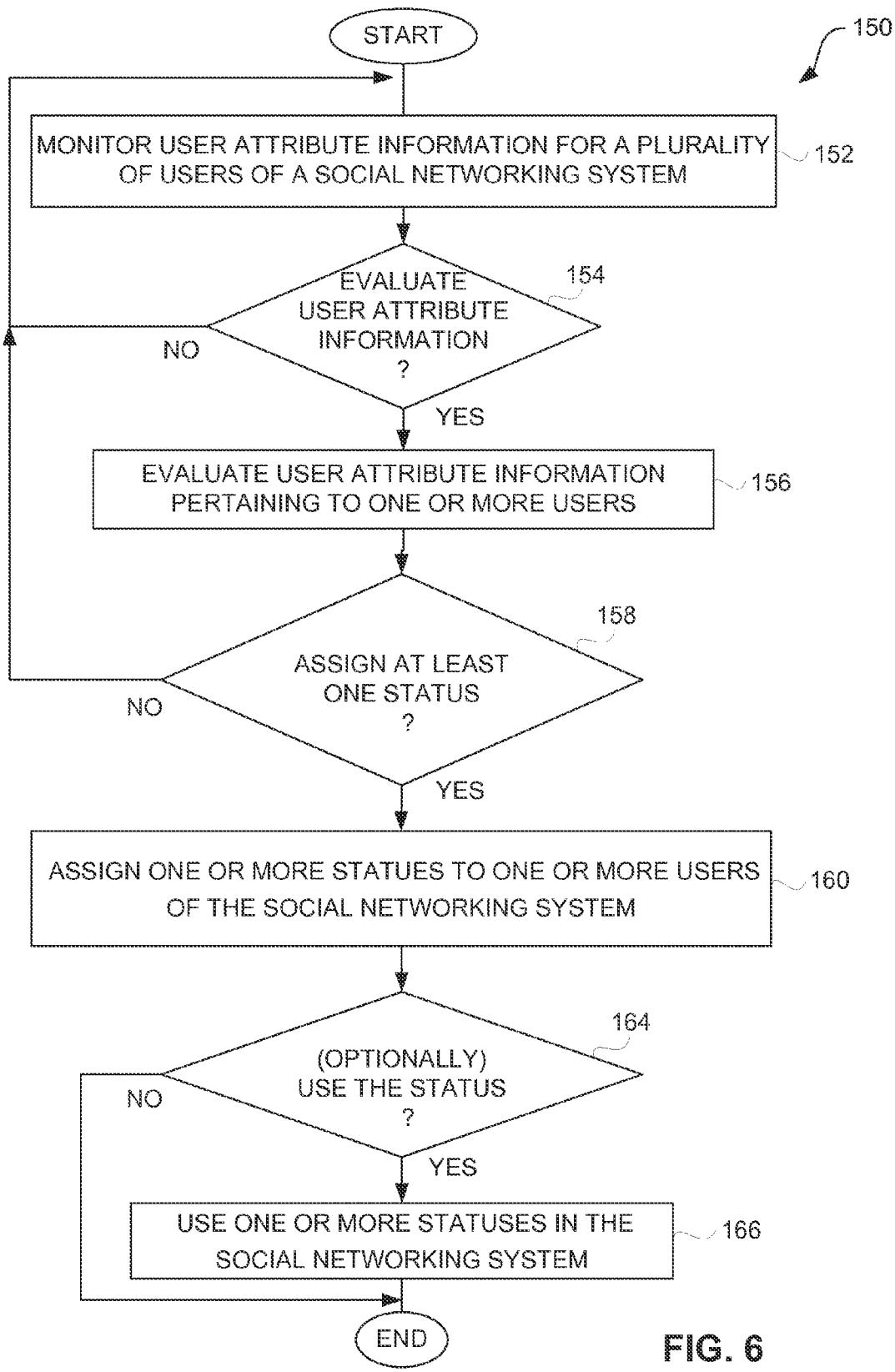
FIG. 6 depicts an exemplary method for assigning (or reassigning) one or more statuses to one or more users of a social networking system in accordance with yet another embodiment.

Although the central server 102 and the online store 124 are depicted in FIG. 5 as separate devices, it should be understood that the central server 102 and the online store 124 can both be hosted on the same device (e.g., server). FIG. 6 depicts an exemplary method 150 for assigning (or reassigning) one or more statuses to one or more users of a social activity or networking system in accordance with yet another embodiment. Method 150 can, for example, be used by the CMS 140 depicted in FIG. 5. Referring to FIG. 6, initially, attribute information for a plurality of users of the social networking system is monitored 152. Next, it is determined 154 whether to evaluate the attribute information. In effect, the method 150 can continue to monitor the attribute information until it is determined 154 to evaluate the attribute information. Those skilled in the art will readily appreciate that the determination 154 can, for example, be made based on a timer, user request, or occurrence of an event (e.g., purchase of a media item, posting a review). In any case, if it is determined 154 to evaluate the attribute information, the attribute information is evaluated 156. The attribute information can pertain to one or more users of the social activity or networking system. Consequently, based on the evaluation, it is determined 158 whether to assign (or reassign or change) at least one status to one or more users of the social networking system. Monitoring of the attribute information can continue, if it is determined 158 not to assign at least one status. However, if it is determined 158 to assign at least one status, at least one status is assigned (reassigned or changed) 160 to one or more users of the social networking system. After the assignment 160, it can optionally be determined whether to use the at least one status that has been assigned. As a result, at least one status can be used, for example, to arrange information provided by the social networking system in accordance with the user status assigned to one or more users. Method 150 can end following the use of the at least one assigned status or following the determination (164) not to use at least one assigned status.

Figure 7:
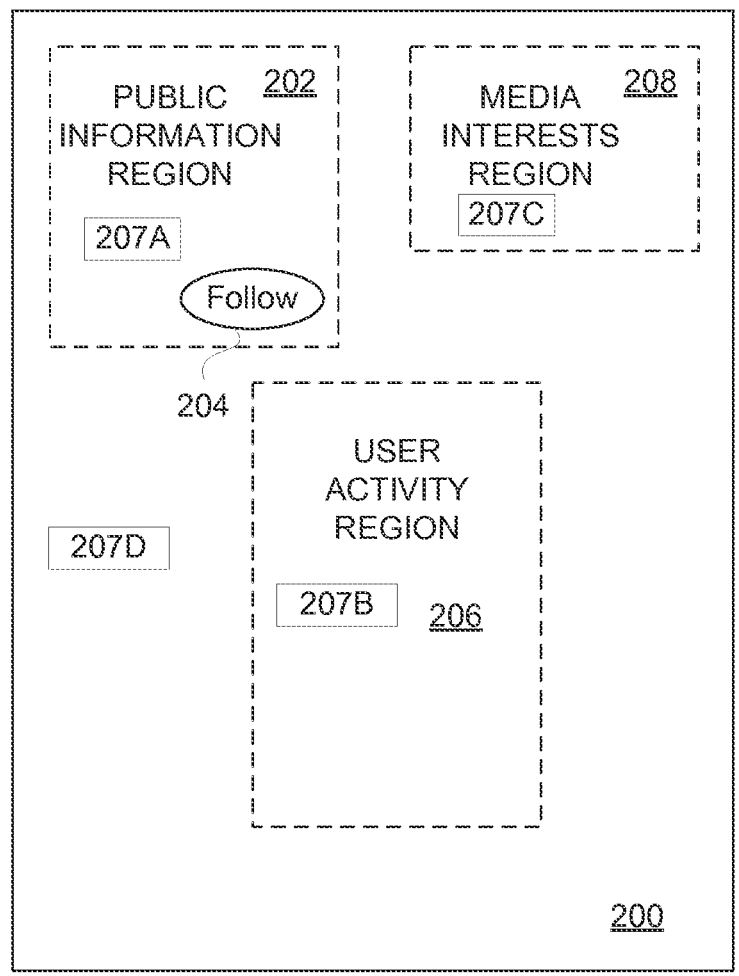
FIG. 7 is an illustrative diagram of a user page according to one embodiment.

FIG. 7 is an illustrative diagram of a user page 200 according to one embodiment. The user page 200 can, for example, represent one implementation of the user page 108 illustrated in FIG. 7. Referring to FIG. 7, one or more user statuses 207 can be displayed in the user page 108. A user status can be displayed inside or outside various regions of the user page 108, including a public information region 202, a user activity region 206, and a media interests region 208 depicted in FIG. 7

The public information region 202 can include information descriptive of the user. The public information region 202 can be publicly accessible by any user. The user page 200 can also include a user control 204 to request to follow the user associated with the user page 200. As such, one or more user statuses 207A assigned to the user associated with the user page 108 can be displayed in public information region 202 and made publicly accessible by any user.

Additionally, the user page 200 can include a user activity region 206. The user activity region 206 can be controlled such that it is visible to only authorized users. For example, the user activity region 206 would be visible to (i) the user associated with the user page 200, and (ii) followers of the user (which have implicitly or explicitly been authorized to view the user activity region 206). As such, one or more user statuses 207B assigned to the user associated with the user page 108 can be displayed in the user activity region 206 and made accessible only to authorized users.

Still further, the user page 200 and can include a media interest region 208. The media interest region 208 can identify one or more media assets or characterize media interests to thereby provide information to other users regarding the media interests of the user corresponding to the user page 200. The media interests can pertain to one or more different types of media assets, including songs, collection of songs (e.g., albums), movies, images, podcasts, electronic books, games or applications. More generally, media assets can be denoted as digital assets, though since most digital assets which have a media aspect, the digital assets are also typically media assets. One or more user statuses can be displayed in media interest region 208 to, for example, provide more information about the users media interests, knowledge and/or level involvement.

Figure 8A:
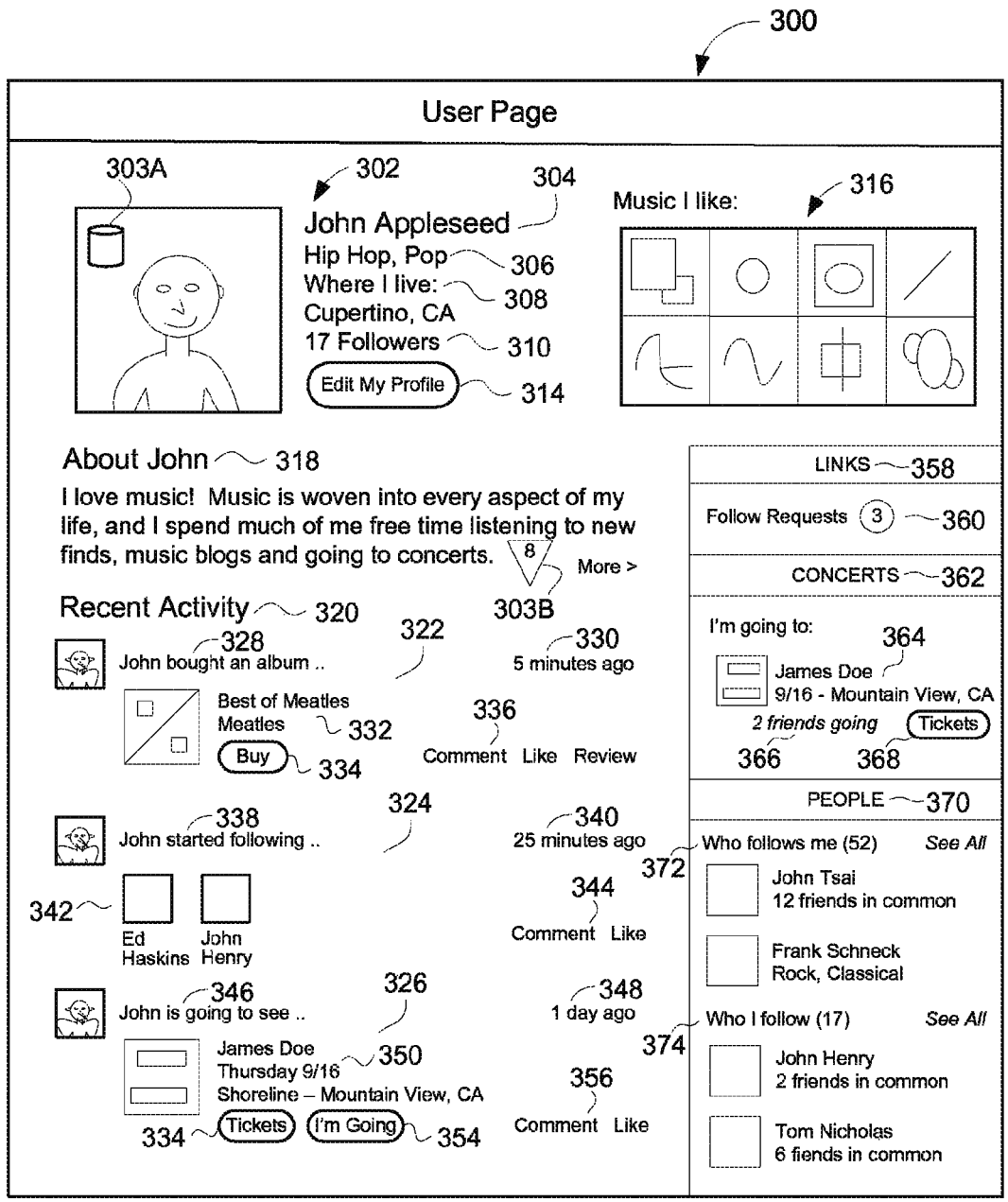
FIG. 8A is a user page according to one embodiment.

FIG. 8A is a user page 300 according to one embodiment. The user page 300 pertains to a particular user of the users of a social network system, such as the social activity system 100. The user page 300 can represent a user page for a user when being viewed by that user. The user page 300 can represent a user page of the social activity system 100 illustrated in FIG. 5. For example, in one implementation, the user page 300 can be an electronic page that is provided by the central server 102 to the user computer 104 for display.

The user page 300 can be presented to the particular user. In this embodiment, the user page 300 is the user page for the particular user. One or more user statuses 303 can be displayed in the user page 300, for example, in various sections depicted in FIG. 5. For example, the user page 300 includes a user section 302 that provides basic description (i.e., profile) for the user. One or more user statuses 303A can be displayed in or in proximity of the user section 302. As illustrated in FIG. 8A, the user section 302 can include a name 304, music genres of interest 306, where the user lives 308, number of followers 310, and an associated image 312. In addition, the user section 302 can include a user control 314 that allows the user to edit the user's profile.

The user page 300 can also include an "I like" section 316. Here, the user can depict digital assets, namely, digital media assets, that they like. For example, as illustrated in FIG. 8A, the digital media assets can pertain to music and representations of selected albums can be represented. In addition to the digital assets, one or more user statues associated with them can be displayed in the "I like" section 316. In the specific example illustrated in FIG. 8A, the "I like" section 316, there is a grid-like presentation of eight albums that represents the musical tastes (i.e., likes) of the user. The selection of the albums or user statuses to be represented can be manually performed by the user or automatically performed by the system.

The user page 300 can also include an about section 318. In this example, the about section 318 is denoted "About John" since the particular user is named John. The about section 318 can include a description of the particular user. If an extensive description is provided, an initial portion of the description can be displayed with any remaining portion being accessible via "more" user control provided in or adjacent to the about section 318. One or more user statuses 303B can also be displayed in the section 318, perhaps in a shorthand form, as an indication of the number of user statuses (e.g., eight (8) statuses) being accessible via "more" user control.

The user page 300 can also include a "recent activity" section 320. The recent activity section 320 can include recent activity associated with, in this case, the particular user. In the user page 300 shown in FIG. 3A, the recent activity section 320 includes three (3) distinct recent activities of the particular user. These distinct recent activities can be referred to as a first recent activity 322, a second recent activity 324, and a third recent activity 326. One or more user statuses associated with the recent activities can also be displayed.

The first recent activity 322 has an activity type description 320 that indicates that the particular user, i.e., John, recently bought an album. A timing indication 330 indicates that the album was, in this example, purchased five (5) minutes ago. The first recent activity 322 can also provide descriptive information 332 for the album that has been purchased. In this example, the descriptive information 332 can include the title of the album, the name of the artist, and a representative image (such as album cover art). In addition, one or more user statuses pertaining to this album can be displayed to provide, for example, the level of interest or knowledge of the user with respect to this or similar albums.

Still further, the first recent activity 332 can include a user control 334 that facilitates purchase of the same album that was previously bought. A user status may assist other user in determining whether to purchase the album or not. The first recent activity 322 can also display user controls 336 that allow users to leave a comment, indicate that they like (or dislike) the purchase, or provide a review for the album.

The second recent activity 324 has an activity type description 338 that indicates that the particular user, i.e., John, recently started to follow one or more other users (e.g., people or artists). A timing indication 340 indicates that, in this example, the particular user starting follow the one or more other users twenty-five (25) minutes ago. User statues for these other users can also be displayed thereby assisting others in deciding whether or not they would like to follow the one or more users that John has recently started to follow.

The second recent activity 324 can also provide followed user information 342 to identify the one or more other users being now followed by the particular user. For example, the followed user information 342 can provide a name and an associated image for each of the newly followed users. Similarly, statuses for the newly followed users can be displayed. The second user activity 324 can also display user controls 344 that allow users to leave a comment or indicate that they like (or dislike) the following of the newly followed users.

The third recent activity 326 has an activity type description 346 that indicates that the particular user, i.e., John, is going to see an event. In this example, the event is a concert but in general that event can be any event (though preferably a ticketed event). A timing indication 348 indicates that the particular user decided to go (or confirm he was going) to the event one (1) day ago. The third recent activity 326 can also provide descriptive information 350 for the concert. In this example, the descriptive information 350 can include the name of the artist, date and location for the concert and can also include a representative image (such as concert poster). One or more user statuses pertaining to the event can also be displayed to, for example, indicate the level of interest or knowledge of the user regarding this particular concerts, local concerts, or generally in concerts. Still further, the third recent activity 326 can include a user control 352 that facilitates purchase of tickets to the concert, and/or a user control 354 that enables a user to designate that they are going to the concert. Again, a status displayed can assist other users in deciding to purchase a ticket to the concert. The third user activity 326 can also display user controls 356 that allow users to leave a comment or indicate that they like (or dislike) the concert.

The user page 300 can also include a links section 358. In the links section 358 information concerning links or connections for the particular user of the user page 300 can be provided. As illustrated in FIG. 8A, the links section 358 can indicate to the particular user the number of outstanding follow requests 360 that have been received. In this example, the links section 358 indicates that the particular user has three (3) pending follow requests. User status for the follow request can be displayed and assist John in deciding to grant or deny the requests to follow him.

The user page 300 can also include a concert section 362. In the concert section 362, information concerning one or more concerts can be provided. The concerts are, however, concerts that the particular user has previously indicated that they are going. As illustrated in FIG. 8A, the concert section 362 indicates that the particular user is going to a particular concert. Concert information 364 can be provided in the concert section 362 to describe the particular concert. For example, the concert information 364 can include name of the artist, the date of the concert, the location of the concert, and perhaps a graphic associated with the artist or concert. In addition, the concert section 362 can provide a friends indication 366 that identifies those friends of the particular user that the system knows that are going to the same concert and statuses for the friends can be displayed. In this example, the friend indication 366 denotes that "2 friends going" and their user statuses can be displayed. Still further, the concert section 362 can provide a user control 368 that facilitates purchase of tickets to the particular concert.

The user page 300 can also include a people section 370. The people section 370 can provide abbreviated listings for people of the user follows or is followed by. The statuses of the people can also be made accessible or displayed. The people section 370 can include a "who I follow" section 372 that can depict information, including one or more user statuses, on a subset of the other users that the particular user of the user page 300 follows. The people section 370 can also include a "who follows me" section 374 that can depict information on a subset of those other users that are currently following the particular user of the user page 300. The people section 370 can also include user controls (e.g., "See All") that allow the user to see all of the people that the user follows or that follow the user.

Figure 8B:
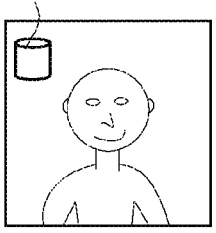
FIG. 8B is a user page according to another embodiment.

FIG. 8B is a user page 380 according to another embodiment. The user page 380 pertains to a particular user of the users of a social network system, such as the social activity following system 100. The user page 380 can represent a connection page of the social activity following system 100 illustrated in FIG. 5. The user page 380 can represent a user page for a particular user when being viewed by another user that is not presently following the particular user.

The user page 380 can be presented to the another user. In this embodiment, the user page 380 is the user page for a particular user that the another user is interested in viewing (and possibly following). The user page 380 is generally similar to the user page 300 illustrated in FIG. 8A. There are, however, some differences. The user section 302 is generally the same; however, the user control 314 can be replaced with a user control 382 (e.g., "Follow" button). The user control 382 facilitates the another user in requesting to follow the particular user. The "I like" section 316, the about section 318, the "recent activity" section 320, and the concerts section 362 can all be same or similar to that described with reference to FIG. 8A. The links section 358 is removed from the user page 380 since such is inappropriate for the another user. The people section 370 is generally similar to that described with reference to FIG. 8A. However, one subsections in the people section 370 can be recast as "John follows" and can depict information on a subset of the other users that the particular user (i.e., John) of the user page 300 follows. The other sub-section in the people section 370 can be recast as "Who follows me" and can depict information on a subset of those other users that are currently following the particular user of the user page 300. User status assigned to the particular user (i.e., John) as well as other users in the user page 300 can be very helpful to the another user to, among other things, decide who to follow and make more informed decisions with respect to pursuit of social activity, as well as attending events, media purchase, and so on.

FIG. 9 is a connection page 400 according to one embodiment. The connection page 400 pertains to a particular user of the users of a social network system, such as the social activity system 100. The connection page 400 can represent a page providing activity information concerning various other users that the particular user follows. The connection page 400 can represent a page provided by the social activity system 100 illustrated in FIG. 5. For example, in one implementation, the connection page 300 can be an electronic page that is provided by the central server 102 to the user computer 104 for display. Also, since the connection page 400 is affiliated with a user, the connection page 400 can also be referred to as a user page.

The connection page 400 can be presented to the particular user. In this embodiment, the connection page 400 is a connection for the particular user. The connection page 400 provides information, such as activity information, concerning connections (e.g., other users that are followed) to the particular user. Generally, user classifications or statuses can be used to filter the information provided in the connection page 400. By way of example, recent activities (e.g., reviews posted, media purchases) or users that are not of a desired status (e.g., music fans) can be filtered for the particular user.

Referring to FIG. 9, the connection page 400 can include a "recent activity" section 401. The recent activity section 401 can pertain to an activity feed being presented by the connection page 400. The recent activity section 401 can include recent activity associated with those other users being followed by the particular user. In the connection page 400 shown in FIG. 9, the recent activity section 401 includes a plurality of distinct recent activities of various other users. These distinct recent activities can be presented in a list format with most recent activities at the top of the list. In one embodiment, more recent activities (e.g., activity events) of those users being followed can be noted towards the top portion of the recent activity section 401. The information in the recent activity section 401 can be filtered based on user statuses assigned to the users. User statuses may also be made available or displayed to the first recent activity section 401.

A first recent activity 402 has an activity type description 403 that indicates that a user, i.e., Jane, recently bought an album. A timing indication 404 indicates that the album was, in this example, was purchased fifteen (15) minutes ago. The first recent activity 402 can also provide descriptive information 405 for at the album that has been purchased. In this example, the descriptive information 405 can include the title of the album, the name of the artist, and a representative image (such as album cover art). Still further, the first recent activity 402 can include a user control 406 (e.g., "Buy" button) that facilitates purchase of the same album that was previously bought. The first recent activity 402 can also display user controls 407 that allow users to leave a comment, indicate that they like (or dislike) the purchase, or provide a review for the album. Such comments may be used to determine a user status in order to assign, reassign, or update a user status.

A second recent activity 408 has an activity type description 409 that indicates that a user, i.e., Ed, recently started to follow one or more other users (i.e., KC and Peter T.). A timing indication 410 indicates that, in this example, the user starting follow these one or more other users thirty-one (31) minutes ago. The second recent activity 408 can also provide followed user information 411 to identify the one or more other users being now followed by the user (i.e., Ed). For example, the followed user information 411 can provide a name, an associated image, and a status for each of the newly followed users. The second user activity 408 can also display user controls 412 that allow users to leave a comment or indicate that they like (or dislike) the following.

A third recent activity 413 has an activity type description 414 that indicates that a user, i.e., Betty, is going to see an event. In this example, the event is a concert but in general that event can be any event (though preferably a ticketed event). A timing indication 415 indicates that the particular user decided to go (or confirm she was going) to the event one (1) day ago. A user status can be displayed for this particular user to indicate whether or not she is likely to be a good lead regarding concert events. The third recent activity 413 can also provide descriptive information 416 for the concert. In this example, the descriptive information 416 can include the name of the artist, date and location for the concert and can also include a representative image (such as concert poster). Still further, the third recent activity 413 can include a user control 417 (e.g., "Tickets" button) that facilitates purchase of tickets to the concert, and/or a user control 418 (e.g., "I'm Going" button) that enables a user to designate that they are going to the concert. The third user activity 413 can also display user controls 419 that allow users to leave a comment or indicate that they like (or dislike) the concert.

A fourth recent activity 420 has an activity type description 421 that indicates that users, i.e., Jimmy, Ray and Agnes, have recently commented on a posted purchase by another user (i.e., Fred). A "See details" user control 422 (e.g., link) allows access to the specific comments by Jimmy, Ray and Agnes. A timing indication 423 indicates that, in this example, the users commented two (2) days ago. The comments of other users may have been filtered based on their statuses. Further, statuses of the users who have posted comments can be made accessible to further assist in evaluating their comments regarding the purchase.

A fifth recent activity 424 has an activity type description 425 that indicates that a user, i.e., Kim, "liked" the purchase made by another user (i.e., Fred). A "Details" user control 426 (e.g., link) allows access to details of the post by Kim, if any. A timing indication 427 indicates that, in this example, the user commented two (2) days ago.

A sixth recent activity 428 has an activity type description 429 that indicates that a user, i.e., Fred, recently bought a product. In this example, the product is a MacBook Pro™, which is a laptop computer from Apple Inc. A timing indication 430 indicates that the product was, in this example, purchased two (2) days ago. Although not shown in FIG. 9, the sixth recent activity 428 could also provide descriptive information (e.g., text and/or image) for at the product that has been purchased. The sixth recent activity 428 can include a user control 431a (e.g., "See" button) that facilitates seeing the product that was previously bought (e.g., by accessing an image, slideshow or movie), and/or a user control 431b (e.g., "Buy" button) that facilitates purchase of the same product that was previously bought. The sixth recent activity 428 can also display user controls 432 that allow users to leave a comment, indicate that they like (or dislike) the purchase, or provide a review for the product.

A seventh recent activity 433 has an activity type description 434 that indicates that a user, i.e., Spence, posted a review on a product or event. In this example, the review pertains to an album. A timing indication 435 indicates that the review was posted two (2) days ago. The seventh recent activity 433 can include review content 436 that contains at least a portion of the review. If more review content is available beyond that displayed a "More" link (not shown) can be provided to access the additional review content. The seventh recent activity 433 can also include descriptive information 437 for the product or event. In this example, the descriptive information 437 can include the name of the album, the artist, and can also include a representative image (such as album cover art). Still further, the seventh recent activity 433 can include a user control 438 (e.g., "Buy" button) that facilitates purchase of the product, e.g., album, that has been reviewed. The seventh recent activity 433 can also include a user control 439 (e.g., "Show album" link) that enable the user to view additional information concerning the album (e.g., track list, etc.). The seventh recent activity 433 can also display user controls 440 that allow users to post the review, indicate that they like (or dislike) the review, or flag the review for editorial review.

A eighth recent activity 441 has an activity type description 442 that indicates that a user, i.e., Kim, has indicated her mood as "relaxed". A "More" user control (e.g., link) allows access to access additional details of the mood of Kim, if any. A timing indication 443 indicates that, in this example, the user posted her mood two (2) days ago.

A ninth recent activity 444 has an activity type description 445 that indicates that a user, i.e., Jane, recently bought a song. A timing indication 446 indicates that the album was, in this example, was purchased two (2) days ago. The ninth recent activity 444 can also provide descriptive information 447 for at the song that has been purchased. In this example, the descriptive information 405 can include the name of the song, the name of the artist, and a representative image (such as album cover art). Still further, the ninth recent activity 444 can include a user control 448 (e.g., "Buy" button) that facilitates purchase of the same song that was previously bought. A further user control can also be provided to allow a user to initiate preview of the song. The ninth recent activity 444 can also display user controls 449a that allow users to leave a comment, or indicate that they like (or dislike) the purchase. In this example, adjacent the user controls 449a is an indication 449b that five (5) others have already indicated that they like the purchase.

The connection page 400 can also include a greeting 450 for the user, which in this example is "John". The connection page 400 can also include a connection navigation section 451. In the connection navigation section 451, the user can navigate to other pages, such as via a Follow Requests page indicator 452, a My Profile page indicator 453, a People page indicator 454, a Featured Artists page indicator 455, and a Featured People page indicator 456. These indicators can, for example, be links. As illustrated in FIG. 9, adjacent the Follow Requests page indicator, the connections navigation section 451 can indicate to the user the number of outstanding follow requests that have been received. In this example, the connection navigation section 451 indicates that the particular user has three (3) follow requests.

The connection page 400 can also include a connection charts section 457. The connection charts section 457 can include at least one chart of songs. For example, the chart can be a list of songs that are most popular, most frequently played, or most common amongst one's social network, etc. The connection charts section 457 shows a chart including five (5) songs.

The connection page 400 can also include a concert section 458. In the concert section 458, information concerning one or more concerts can be provided. The concerts are those that may be of interest to the user. The concerts section 458 includes a "Near You" section 459 where concerts near the user can be identified. As illustrated in FIG. 9, the Near You section 459 indicates that there is an upcoming concert in the geographic area of the user. Concert information 460 can be provided in the Near You section 459 to describe the particular concert. For example, the concert information 460 can include name of the artist, the date of the concert, the location of the concert, and perhaps a graphic associated with the artist or concert. In addition, the Near You section 459 can provide a friends indication 461 that identifies those friends of the particular user that the system knows are going to the same concert. In this example, the friends indication 461 denotes that "2 friends going". Still further, the Near You section 459 can provide a user control 462 (e.g., "Tickets" button) that facilitates purchase of tickets to the particular concert.

The concerts section 458 can also include an "On Tour" section 463 where concerts our tour that may be of interest to the particular user. The one or more concerts identified in the On Tour section 463 can be determines by a server, such as the central server 102 illustrated in FIG. 5. The one or more concerts identified can be selected based on user interest (media profile, collection or usage), friends/followed users attending or liking, geographical, etc. As illustrated in FIG. 9, the On Tour section 463 indicates that there is an upcoming concert of likely interest to the user. Concert information 464 can be provided in the On Tour section 463 to describe the particular concert. For example, the concert information 464 can include name of the artist, the date of the concert, the location of the concert, and perhaps a graphic associated with the artist or concert. In addition, the On Tour section 463 can provide a friends indication 465 that identifies those friends of the particular user that the system knows are going to the same concert. In this example, the friends indication 465 denotes that "2 friends going". Still further, the On Tour section 463 can provide a user control 466 (e.g., "Tickets" button) that facilitates purchase of tickets to the particular concert.

The connection page 400 can also include a "Recommend You Follow" section 467. The Recommend You Follow section 467 can identify those one or more other users that the system recommends the user, i.e., John, might want to follow. Specifically, the system recognizes categories of users, including artists and people. The Recommend You Follow section 467 can include an artist subsection 468 where one or more artists that are recommended can be identified. For a given artist being recommended, the artist subsection 468 can provide descriptive information 469 for the recommended artist. In this example, the descriptive information 469 can include the name of the artist and a representative image for the artist. The system can enable an artist to have a user page, or profile that specifies the name and representative image for the artist. The artist subsection 468 can also provide a followers indication 470 that indicates a number of user presently following the recommended artist.

The Recommend You Follow section 467 can also include a people subsection 471 where one or more people that are recommended can be identified. For a first given person being recommended, the people subsection 471 can provide descriptive information 472 for the recommended person. In this example, the descriptive information 472 can include the name of the person and a representative image for the person. The system can enable a person to have a user page, or profile that specifies the name, media likes, "about" information, and/or representative image for the person. The people subsection 471 can also provide a "friends in common" indication 473 that indicates a number of friends that the user, i.e., John, has in common with the recommended person. Similarly, for a second given person being recommended, the people subsection 471 can provide descriptive information 474 for the recommended person. In this example, the descriptive information 474 can include the name of the person and a representative image for the person. The people subsection 471 can also provide a "friends in common" indication 475 that indicates a number of friends that the user, i.e., John, has in common with the recommended person.

Figure 10A:
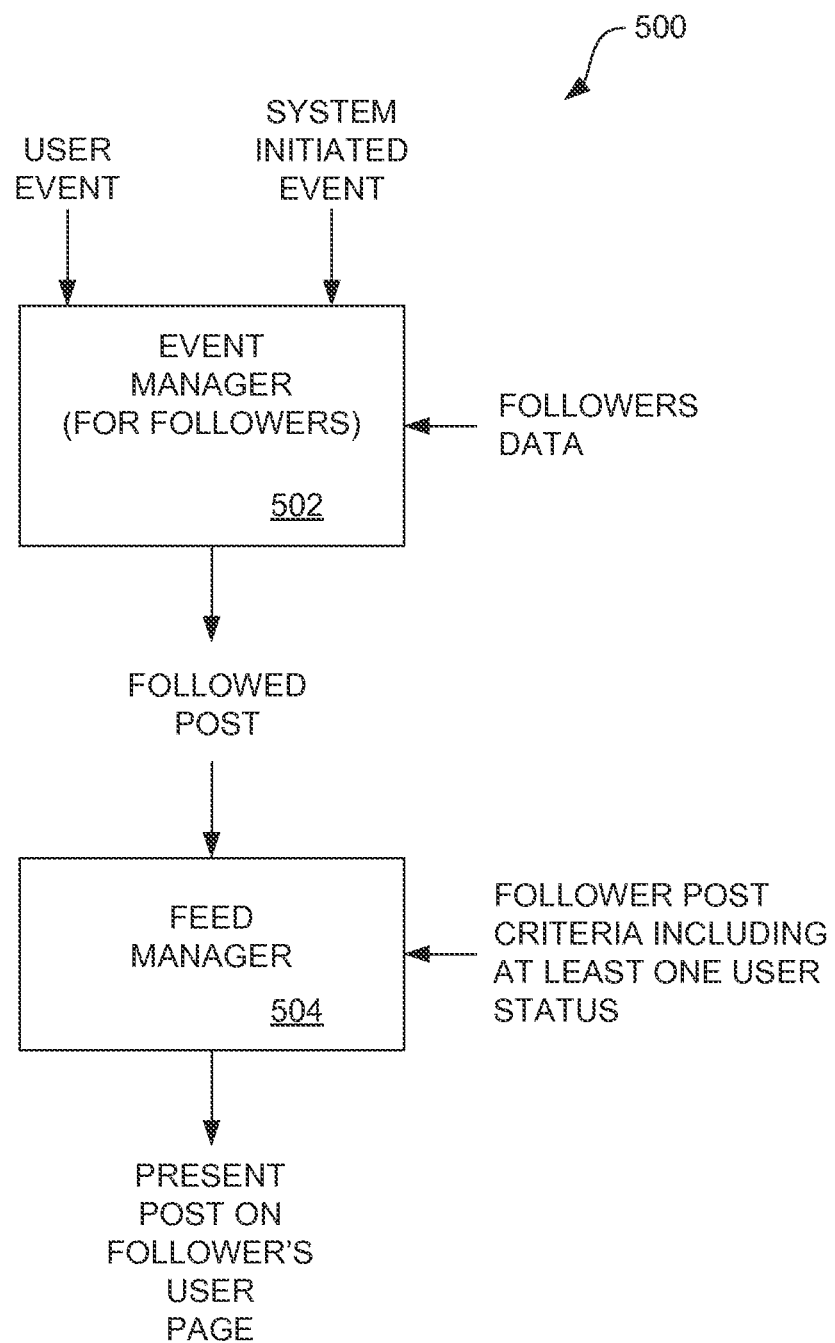
FIG. 10A is a block diagram of an event processing system according to one embodiment.

FIG. 10A is a block diagram of an event processing system 500 according to one embodiment. The event processing system 500 can include an event manager 502. The event manager 502 receives incoming events associated with a particular user. The event manager 502 can produce a followed post that can be supplied to one or more data followers. The one more data followers are users of the system that have elected to follow the particular user. The incoming events being received at the event manager 502 can include user initiated events and/or system initiated events. For example, a user initiated and is an event that is initiated by the user, such as when a user posts their status in their activity fee. As an example, a system initiated the event is an event that is initiated by the system. One example of an event initiated by the system is referred to as a commerce event, such as when the particular user purchases of products, typically via the system. Accordingly, the event manager 502 produces one or more followed post that are supplied to one or more data followers. The event manager 502 can receive followers data that identifies the one or more data followers for the events associated with the particular user.

The event processing system 500 can also include a feed manager 504 that is associated with a representative follower. In other words, in one environment, each follower of the particular user will have an associated feed manager 504. The feed manager 504 receives the followed post from the event manager 504. However, the feed manager 504 can serve to restrict the quantity of incoming posts that are presented to the representative follower. In particular, the feed manager 504 can receive follower criteria including one or more restrictions based of the user including at least one user status assigned by the system. The follower criteria is a criteria that can be used by the feed manager 504 to restrict, limit or filter the incoming followed post at least partly based on user status or classification. The follower criteria can be automatically determined by the system, set by user selections or preferences, or some combination thereof. Those of the followed post that the feed manager 504 permits to be delivered to the representative follower can be supplied by the feed manager 504 to a follower's user page where the followed post can be presented. For example, followed post can be presented in the follower's user page in an activity feed.

Figure 10B:
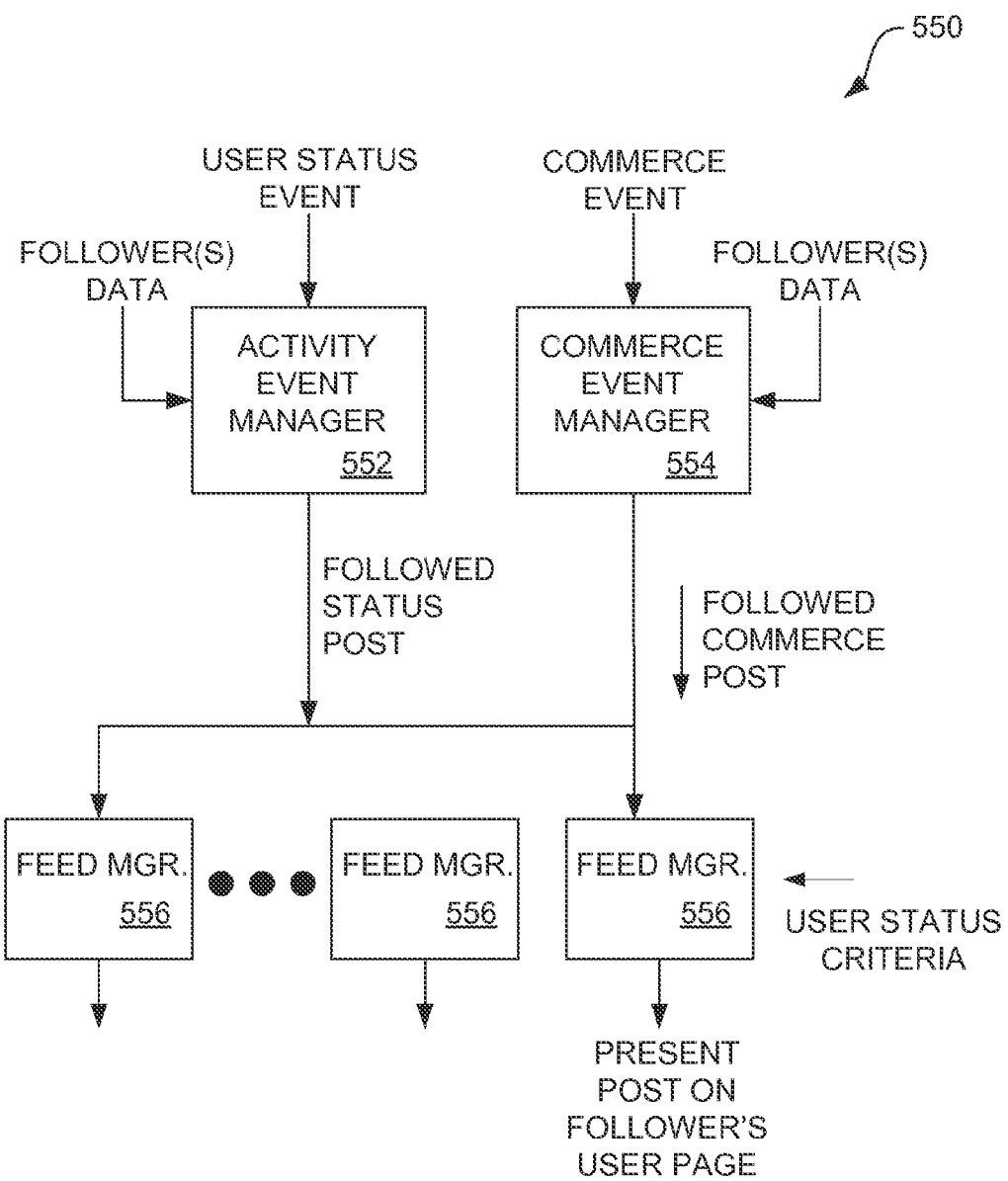
FIG. 10B is a block diagram of an event processing system according to another embodiment.

FIG. 10B is a block diagram of an event processing system 550 according to another embodiment. The event processing system 550 includes an activity event manager 552 that receives user status events from a particular user. The event processing system 550 also includes a commerce event manager 554 that receives commerce events from the particular user. The activity event manager 552 determines one or more followers that are to receive a followed status post concerning the particular user. The activity event manager 552 can receive follower's data that identifies one or more users that are following the particular user. The followed status post from the activity event manager 552 is directed to one or more feed managers 556. In this environment, each of the different users can utilize a different one on the feed managers 556. Hence, the followed status post from the activity event manager 552 can be delivered to the appropriate one or more of the feed managers 556 corresponding to those of the followers of the particular user.

The one or more feed managers 556 can process the incoming posts that it receives. For example, the feed manager 556 can receive a followed status post from the activity event manager 552 and can receive followed commerce post from the commerce event manager 554. Each of the feed managers 556 can separately evaluate whether to present a post on the corresponding follower's user page at least partly based on one or more user statuses assigned by the system. That is, for a given incoming posts, the feed manager 556 can evaluate whether the post should be presented on the follower's user page by evaluating one or more user statuses assigned by the system. The follower criteria for the corresponding user, including one or more user status criteria for the corresponding user can be utilized by the feed manager 556 make a intelligent decision on whether or not to present an incoming post on the follower's user page at least partly based on the user status criteria. The post, if presented on the follower's user page, can for example be presented as indicated in the activity region 401, such as recent activity 402, 413, 428 or 444, such as illustrated in FIG. 8.

Figure 11A:
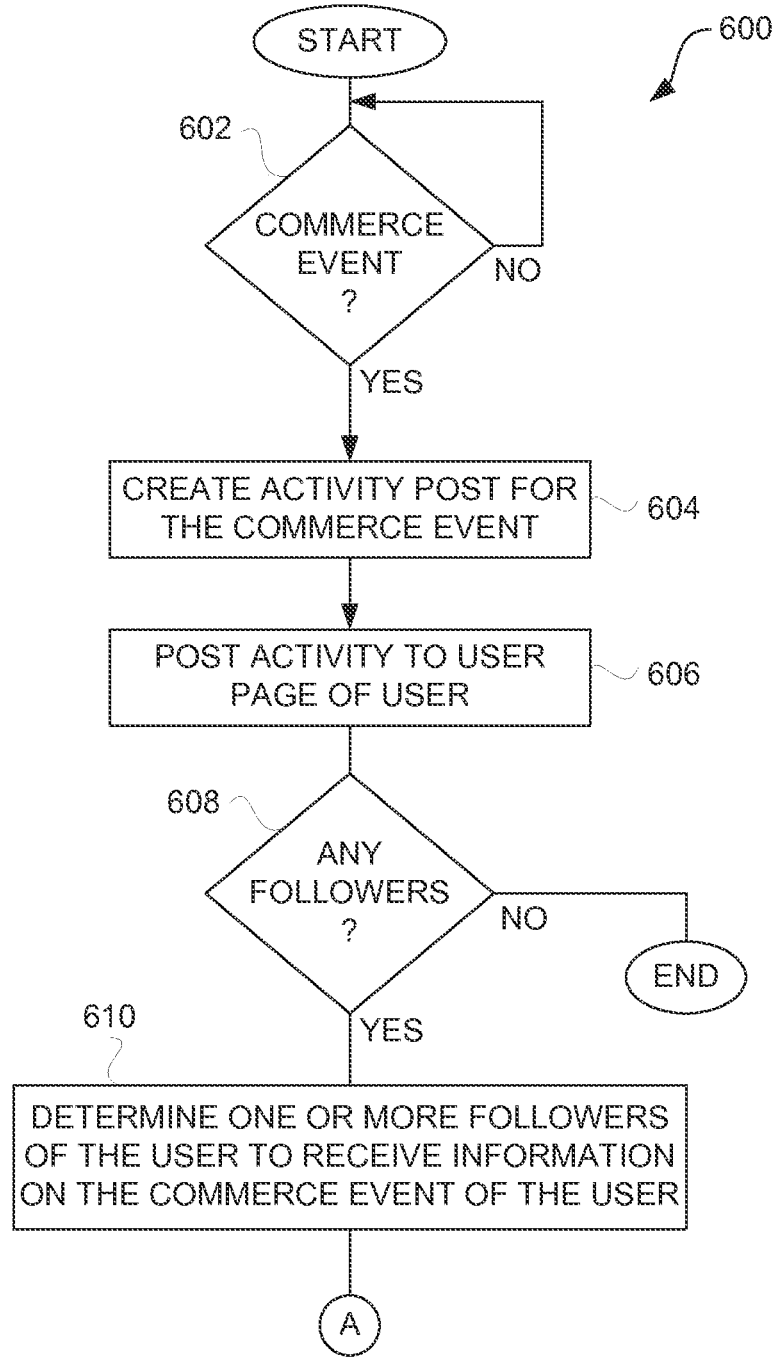
FIGS. 11A and 11B are flow diagrams of a commerce posting process according to one embodiment.
Figure 11B:
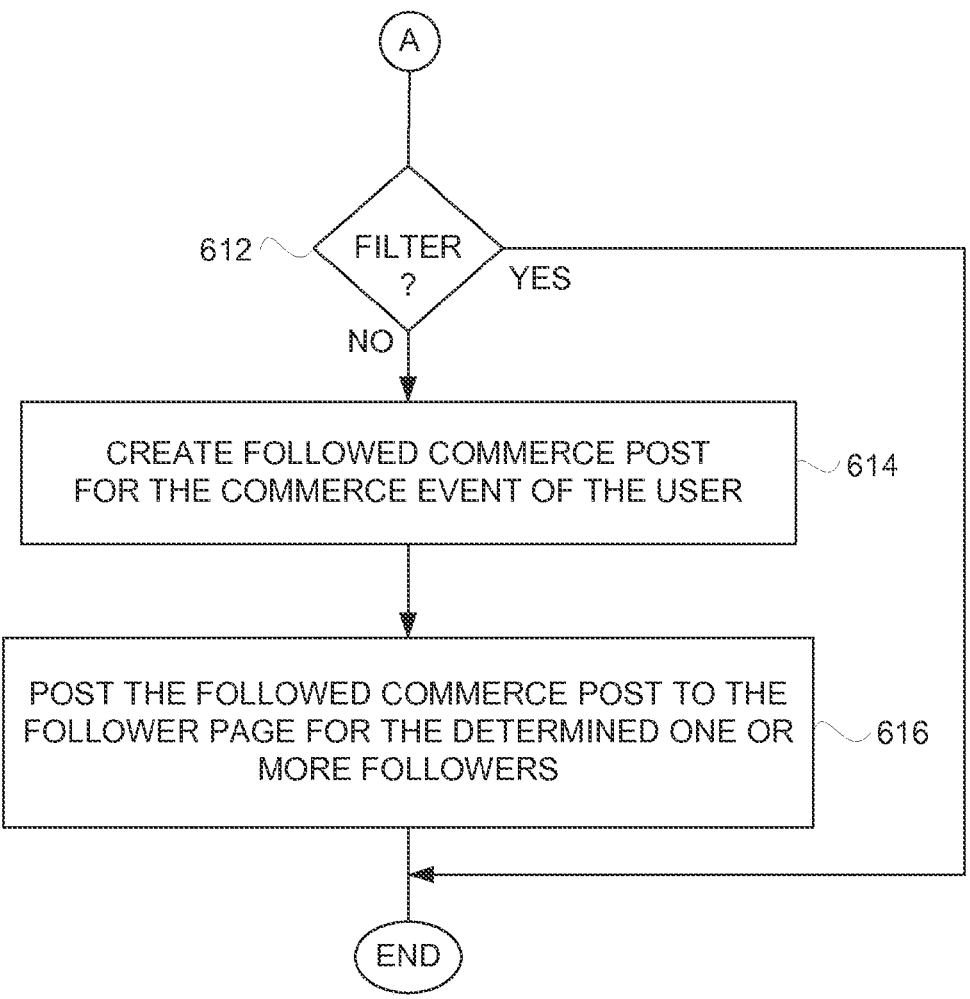

FIGS. 11A and 11B are flow diagrams of a commerce posting process 600 according to one embodiment. The commerce posting process 600 can, for example, be performed by a server, such as the central server 102 illustrated in FIG. 5.

The commerce posting process 600 can begin with a decision 602 that determines whether a commerce event has been received. The commerce event is associated with a user. Typically, the commerce event results from a purchase, namely, an online purchase, of a product by the user. The product can be a digital product, such as a digital media asset or digital program, that can be delivered electronically (e.g., downloaded) or a physical product that can be delivered by courier (e.g., Federal Express, Universal Parcel Service, etc.). When the decision 602 determines that a commerce event has not been received, the commerce posting process 600 can await such an event. Once the decision 602 determines that a commerce event for the user has been received, an activity post for the commerce event can be created 604. The activity post can include at least a textual message explaining the purchase by the user. In one implementation, the activity post is computer generated (e.g., by the server) without assistance from the user (i.e., system generated). In another implementation, the activity post is partially computer generated and the user contributes to the activity post. Besides a textual message, the activity post can also include a graphical component, such as an image of the product that has been purchased. After the activity post has been created 604, the activity post can be posted 606 to a user page of the user.

Following posting 606 of the activity post, a decision 608 can determine whether there are any followers of the user. Typically, a follower of the user decides to follow the user to receive activity posts associated with the user. Often, the user will have a user page and any followers will also have a user page. If the decision 608 determines that there are no followers of the user, the commerce posting process 600 can end. However, on the other hand, if the decision 608 determines that there are followers of the user, one or more followers of the user that are to receive information concerning the commerce event can be determined 610. Here, in this embodiment, the information concerning the commerce event is provides as a post in an activity feed of the one or more followers. More specifically, it can be determined 612 whether to filter the information concerning the commerce event based on user status criteria. Accordingly, the information concerning the commerce event can be effectively filtered. As a result, the information concerning the commerce event is not posted and the commerce posting process 600 can end if it is determined to filter the information concerning the commerce event. However, if it is determined 612 not to filter the commerce event, a followed commerce post can be created 614 for the commerce event of the user. In one embodiment, creation 614 of the commerce post can be by the server (e.g., computer generated).

The followed commerce post can then be posted 616 to the follower page for the determined one or more followers. It should be noted that the determination of whether to filter the information concerning the commerce event can have different results for different followers depending on their user status filtering criteria. As such, the followed commerce post may be posted 614 to all, some or none of the one more followers for the user. After the followed commerce post has been posted 614, the commerce posting process 600 can end.

Figure 12:
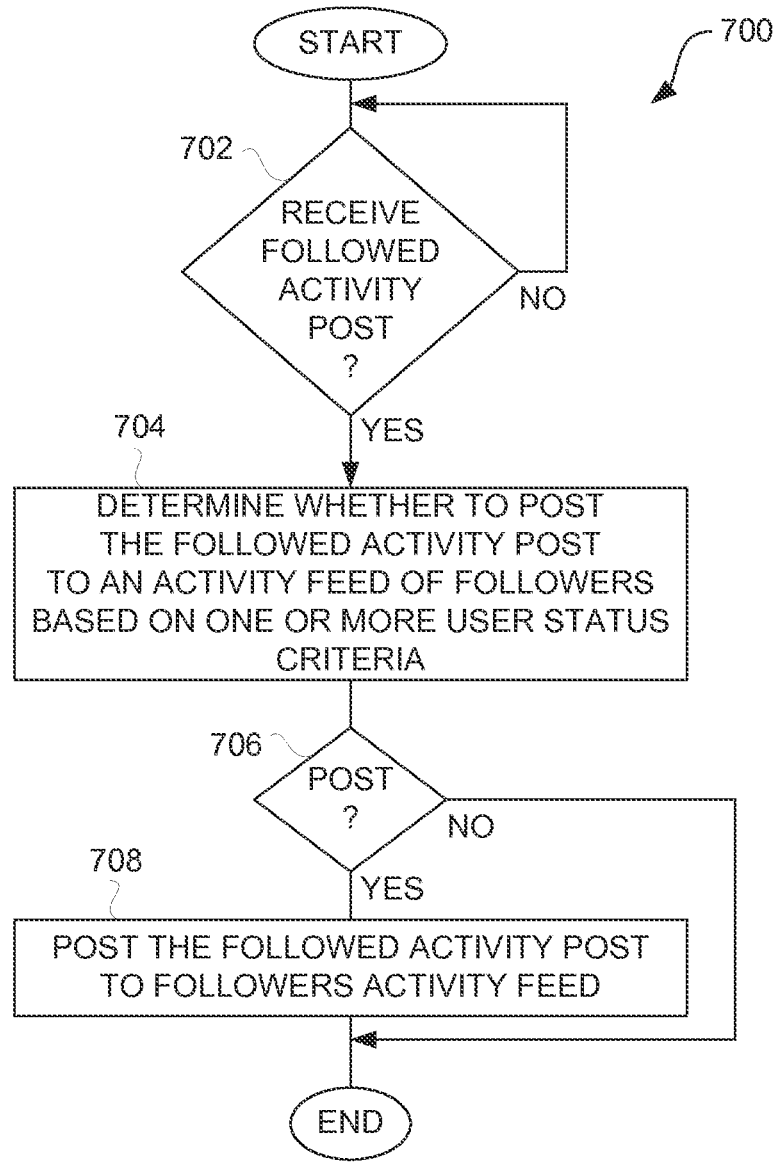
FIG. 12 is a flow diagram of a followed activity posting process according to one embodiment.

FIG. 12 is a flow diagram of a followed activity posting process 700 according to one embodiment. The followed activity posting process 700 can begin with a decision 702 that determines whether a followed activity post has been received. When the decision 702 determines that a followed activity post has not been received, the followed activity posting process 700 can await receipt of a followed activity post. Alternatively, when the decision 702 determines that a followed activity post has been received, the followed activity posting process 700 can determine 704 whether to post the followed activity post to an activity feed of one or more of the followers based on one or more criteria. A decision 706 can then determine based on one or more user status criteria whether the followed activity post is to be posted to one or more of the followers. When the decision 706 determines that the followed activity post is to be posted, then the followed activity post can be posted 708 to the activity feed of each of the one or more followers that has been determined 704 to receive the feed. Following block 708, as well as following the decision 706 when the followed activity post is not to be posted, the followed activity posting process 700 can end.

Figure 13:
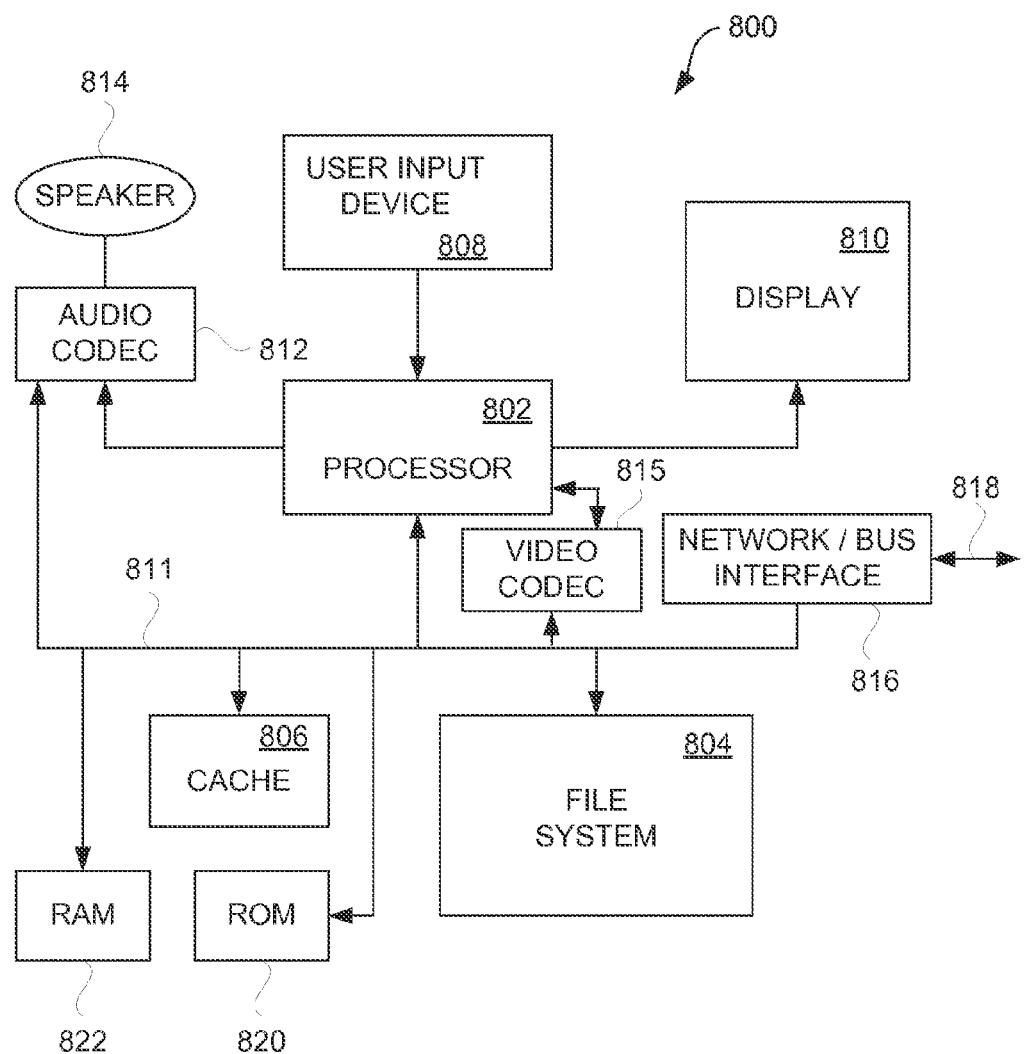
FIG. 13 illustrates a block diagram of a computing device according to one embodiment.

FIG. 13 illustrates a block diagram of a computing device 800 according to one embodiment. The computing device 800 can represent circuitry of a representative computing device (e.g., user or follower computer device), central server, or online store (e.g., online media server) described and illustrated in FIG. 5. The computing device can be designed to primarily stationary or can be portable.

The computing device 800 includes a processor 802 that pertains to a microprocessor or controller for controlling the overall operation of the computing device 800. The computing device 800 stores media data pertaining to media items in a file system 804 and a cache 806. The file system 804 is, typically, semiconductor memory (e.g., Flash memory) and/or one or more storage disks. The file system 804 typically provides high capacity storage capability for the computing device 800. However, since the access time to the file system 804 can be relatively slow, the computing device 800 can also include the cache 806. The cache 806 is, for example, Random-Access Memory (RAM). The relative access time to the cache 806 is typically shorter than for the file system 804. However, the cache 806 does not have the large storage capacity of the file system 804. The computing device 800 also includes a RAM 820 and a Read-Only Memory (ROM) 822. The ROM 822 can store programs, utilities or processes to be executed in a non-volatile manner. The RAM 820 provides volatile data storage, such as for the cache 806.

The computing device 800 may also include a user input device 808 that allows a user of the computing device 800 to interact with the computing device 800. For example, the user input device 808 can take a variety of forms, such as a button, keypad, dial, touch-sensitive surface, etc. Still further, the computing device 800 includes a display 810 (screen display) that can be controlled by the processor 802 to display information to the user. A data bus 811 can facilitate data transfer between at least the file system 804, the cache 806, the processor 802, an audio coder/decoder (CODEC) 812 and/or a video CODEC 815.

In one embodiment, for example, if the computing device 800 is a media player, the computing device 800 may store a plurality of media items (e.g., songs, videos, podcasts, etc.) in the file system 804. When a user desires to have the computing device play a particular media item, a list of available media items is displayed on the display 810. Then, using the user input device 808, a user can select one of the available media items. The processor 802, upon receiving a selection of a particular media item, supplies the media data to one or more appropriate output devices. If the particular media item is encrypted, the particular media item is first decrypted as noted above, which could involve one or more layers of encryption. As an example, for audio output, the processor 802 can supply the media data (e.g., audio file) for the particular media item to the audio CODEC 812. The audio CODEC 812 can then produce analog output signals for a speaker 814. The speaker 814 can be a speaker internal to the computing device 800 or external to the computing device 800. For example, headphones or earphones that connect to the computing device 800 would be considered an external speaker. As another example, for video output, the processor 802 can supply the media data (e.g., video file) for the particular media item to the video CODEC 815. The video CODEC 815 can then produce output signals for the display 810 and/or the speaker 814.

The computing device 800 also includes a network/bus interface 816 that couples to a data link 818. The data link 818 allows the computing device 800 to couple to another device (e.g., a host computer, a power source, or an accessory device). The data link 818 can be provided over a wired connection or a wireless connection. In the case of a wireless connection, the network/bus interface 816 can include a wireless transceiver.

Additional information is provided in U.S. Patent Provisional Application No. 61/378,839, filed Aug. 31, 2010 and entitled "NETWORKED SYSTEM WITH SUPPORTING MEDIA ACCESS AND SOCIAL NETWORKING," and U.S. patent application Ser. No. 13/216,197 entitled "NETWORKED SYSTEM WITH SUPPORTING MEDIA ACCESS AND SOCIAL NETWORKING," which are both hereby incorporated herein by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of filtering notifications to a device of a social network, the method comprising:
   assigning one or more user-statuses;
   receiving, using at least one feed manager at a server, a status-restriction from a first device, the at least one feed manager configured to evaluate whether to present a post on a user page associated with the first device at least partly based on the one or more user-statuses;
   receiving, at the server, an indication of a selection from the first device corresponding to an activity feed associated with a second device;
   receiving, at the server, an indication of media collection information associated with the second device, wherein the media collection information comprises media content and metadata;
   assigning a status identifier corresponding to the second device based, at least in part, on the indication of the media collection and one or more of media usage information, social network information, social information, individual user information, aggregate user information, user profile information, product information pertaining to one or more products associated with one or more devices, and application information pertaining to one or more applications;
   receiving, at the server, activity feed information from the second device;
   determining whether the status identifier of the second device violates the status-restriction;
   sending a notice to the first device of the received activity feed information when the status identifier of the second device does not violate the status-restriction;
   receiving, at the server, an indication of a social network event triggered by an action at a third device, wherein the third device is associated with the second device;
   determining whether a status identifier of the third device violates the status-restriction; and
   sending a notice to the first device of the received indication of the social network event, after such determination, the notice usable for assigning one or more user-statuses reflecting a user-ranking or a user-position, with respect to at least one of media and one or more applications pertaining to one or more of a specific category, genre, narrow topic, item, or asset.

2. The method of claim 1, wherein the status identifier of the second device corresponds to a high level of expertise in an activity associated with the media collection.

3. The method of claim 1, wherein sending a notice by the server comprises sending instructions to the first device to display the received activity feed information.

4. The method of claim 1, wherein the status identifier of the second device and the status identifier of the third device are associated with different subject areas.

5. The method of claim 1, further comprising updating, by the server, the status identifier of the second device based, at least in part, on an updated indication of the media collection.

6. The method of claim 4, wherein the status identifier of the second device is associated with a subject area.

7. The method of claim 6, wherein the subject area comprises a genre of digital media assets.

8. The method of claim 6, wherein the subject area pertains to an artist or author of digital media assets.

9. A social networking computing system comprising:
   at least one memory storing computer-readable instructions;
   one or more processors communicatively coupled to the at least one memory and configured, upon execution of the computer-readable instructions, to:
   assign one or more user-statuses;
   receive, using at least one feed manager at a server, a status-restriction from a first device, the at least one feed manager configured to evaluate whether to present a post on a user page associated with the first device at least partly based on the one or more user-statuses;
   receive, at the server, an indication of a selection from the first device corresponding to an activity feed associated with a second device;
   receive, at the server, an indication of media collection information associated with the second device, wherein the media collection information comprises media content and metadata;
   assign a status identifier corresponding to the second device based, at least in part, on the indication of the media collection and one or more of media usage information, social network information, social information, individual user information, aggregate user information, user profile information, product information pertaining to one or more products associated with one or more devices, and application information pertaining to one or more applications;
   receive, at the server, activity feed information from the second device;
   determine whether the status identifier of the second device violates the status-restriction;
   send a notice to the first device of the received activity feed information when the status identifier of the second device does not violate the status-restriction;
   receive, at the server, an indication of a social network event triggered by an action at a third device;
   determine whether a status identifier of the third device violates the status-restriction; and
   send a notice to the first device of the social network event when the status identifier of the third device does not violate the status-restriction, the notice usable for assigning one or more user-statuses reflecting a user-ranking or a user-position, with respect to at least one of media and one or more applications pertaining to one or more of a specific category, genre, narrow topic, item, or asset.

10. The method of claim 1, wherein the second device and the third device are associated with different media collection information.

11. The social network computing system of claim 9, wherein the status identifier of the second device corresponds to a high level of expertise in an activity associated with the media collection information.

12. The social network computing system of claim 9, wherein sending the notice by the server comprises sending instructions to the first device to display the received activity feed information.

13. The social network computing system of claim 9, wherein the status identifier of the second device is associated with a subject area.

14. The social network computing system of claim 13, wherein the subject area comprises a genre of digital media assets.

15. The social network computing system of claim 13, wherein the subject area pertains to an artist or author of digital media assets.

16. A social network application stored on a non-transitory computer-readable medium, the social network application comprising instructions executable to cause one or more processors to:
assign one or more user-statuses;
receive, using at least one feed manager at server, a status-restriction from a first device, the at least one feed manager configured to evaluate whether to present a post on a user page associated with the first device at least partly based on the one or more user-statuses;
receive, at the server, an indication of a selection from the first device corresponding to an activity feed associated with a second device;
receive, at the server, an indication of media collection information associated with the second device, wherein the media collection information comprises media content and metadata;
assign a status identifier corresponding to the second device based, at least in part, on the indication of the media collection and one or more of media usage information, social network information, social information, individual user information, aggregate user information, user profile information, product information pertaining to one or more products associated with one or more devices, and application information pertaining to one or more applications;
receive, at the server, activity feed information from the second device;
determine whether the status identifier of the second device violates the status-restriction;
send a notice to the first device of the received activity feed information when the status identifier of the second device does not violate the status-restriction;
receive, at the server, an indication of a social network event triggered by an action at a third device;
determine whether a status identifier of the third device violates the status-restriction; and
send a notice to the first device of the social network event when the status identifier of the third device does not violate the status-restriction, the notice usable for assigning one or more user-statuses reflecting a user-ranking or a user-position, with respect to at least one of media and one or more applications pertaining to one or more of a specific category, genre, narrow topic, item, or asset.

17. The social network application of claim 16, further comprising instructions to:
receive, at the server, an indication of a social network event triggered by an action at a third device, wherein the third device is associated with the second device;
determining, by a processor of the server, whether a status identifier of the third device violates the status-restriction; and
sending, by the server, a notice to the first device of the received indication of the social network event, after such determination.

18. The social network application of claim 17, wherein the second device and the third device are associated with different media collection information.

19. The social network application of claim 16, wherein the status identifier of the second device corresponds to a high level of expertise in an activity associated with the media collection.

20. The social network application of claim 16, wherein sending the notice by the server comprises sending instructions to the first device to display the received activity feed information.

21. The social network application of claim 16, wherein the status identifier of the second device is associated with a subject area.

22. The social network application of claim 21, wherein the subject area comprises a genre of digital media assets.

23. The social network application of claim 21, wherein the subject area pertains to an artist or author of digital media assets.

* * * * *